United States Patent
Jung et al.

(10) Patent No.: US 11,554,484 B2
(45) Date of Patent: Jan. 17, 2023

(54) ROBOT

(71) Applicant: LG ELECTRONICS INC., Seoul (KR)

(72) Inventors: Chungin Jung, Seoul (KR); Sunho Yang, Seoul (KR); Eulpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 367 days.

(21) Appl. No.: 16/715,280

(22) Filed: Dec. 16, 2019

(65) Prior Publication Data
US 2020/0206916 A1    Jul. 2, 2020

(51) Int. Cl.
*B25J 9/16*    (2006.01)
*B25J 9/00*    (2006.01)
*B25J 19/00*   (2006.01)
*B25J 5/00*    (2006.01)

(52) U.S. Cl.
CPC ............... *B25J 9/162* (2013.01); *B25J 5/007* (2013.01); *B25J 9/0021* (2013.01); *B25J 19/005* (2013.01)

(58) Field of Classification Search
CPC . B25J 5/007; B25J 9/0021; B25J 9/126; B25J 9/162; B25J 11/00; B25J 11/0005; B25J 19/005; Y10S 901/01; G05D 2201/0203; G05D 2201/0206; G05D 2201/0207; G05D 2201/0211; G05D 2201/0215; G05D 2201/0225
See application file for complete search history.

(56) References Cited

U.S. PATENT DOCUMENTS

| | | |
|---|---|---|
| 2009/0177323 A1 | 7/2009 | Ziegler et al. |
| 2010/0185990 A1 | 7/2010 | Ha et al. |
| 2012/0011669 A1* | 1/2012 | Schnittman ............. B60L 53/14 15/52.1 |
| 2014/0009561 A1* | 1/2014 | Sutherland ............. F16M 11/42 348/14.05 |
| 2015/0012163 A1* | 1/2015 | Crawley .............. G05D 1/0248 701/23 |
| 2015/0094879 A1* | 4/2015 | Pari .......................... B25J 5/007 701/2 |

(Continued)

FOREIGN PATENT DOCUMENTS

| | | |
|---|---|---|
| CN | 207930678 | 10/2018 |
| CN | 208276918 | 12/2018 |

(Continued)

OTHER PUBLICATIONS

United States Office Action dated Feb. 8, 2021 issued in U.S. Appl. No. 16/723,316.

(Continued)

*Primary Examiner* — Dale Moyer
(74) *Attorney, Agent, or Firm* — KED & Associates LLP

(57) ABSTRACT

A robot may include a main body coupled to a traveling unit, a display unit disposed above a front portion of the main body, and a battery incorporated in the main body. The traveling unit may include a wheel having a rotational axis extending in a first direction, and the battery may overlap a vertical plane that extends along the rotational axis. The vertical plane and a center of the battery may be separated by a prescribed distance in a second direction that is orthogonal to the first direction.

12 Claims, 18 Drawing Sheets

(56) References Cited

U.S. PATENT DOCUMENTS

| | | | |
|---|---|---|---|
| 2015/0190927 A1* | 7/2015 | Sutherland | B25J 11/009 700/259 |
| 2017/0255301 A1 | 9/2017 | Norton et al. | |
| 2018/0104829 A1* | 4/2018 | Altman | B25J 9/162 |
| 2018/0178377 A1 | 6/2018 | Yang et al. | |
| 2020/0406468 A1 | 12/2020 | Stoianovici et al. | |

FOREIGN PATENT DOCUMENTS

| | | |
|---|---|---|
| JP | 2006-136963 | 6/2006 |
| KR | 10-0824315 | 4/2008 |
| KR | 10-2009-0128637 | 12/2009 |
| KR | 10-2010-0085297 | 7/2010 |
| KR | 10-1081324 | 11/2011 |
| KR | 10-2017-0056718 | 5/2017 |
| KR | 10-2018-0074499 | 7/2018 |

OTHER PUBLICATIONS

International Search Report dated Sep. 25, 2019 issued in PCT/KR2019/000053.
International Search Report and Written Opinion dated Oct. 1, 2019 issued in PCT/KR2019/000051.

* cited by examiner

ROBOT

CROSS-REFERENCE TO RELATED APPLICATION

The present application claims priority under 35 U.S.C. 119 and 35 U.S.C. 365 to Korean Patent Application No. PCT/KR2019/000048, filed in Korea on Jan. 2, 2019, which is hereby incorporated by reference in its entirety.

BACKGROUND

1. Field

The present disclosure relates to a robot that is capable of autonomous driving.

2. Background

Robots have been developed for various uses, such as to perform tasks related to factory automation, medical treatments, and space and undersea exploration. The applications for robots are being further expanded to include tasks in daily life, such as to perform various services related to shopping, cleaning, etc. in response to a user's commands.

BRIEF DESCRIPTION OF THE DRAWINGS

Embodiments will be described in detail with reference to the following drawings in which like reference numerals refer to like elements, and wherein.

DETAILED DESCRIPTION

Figure 1:
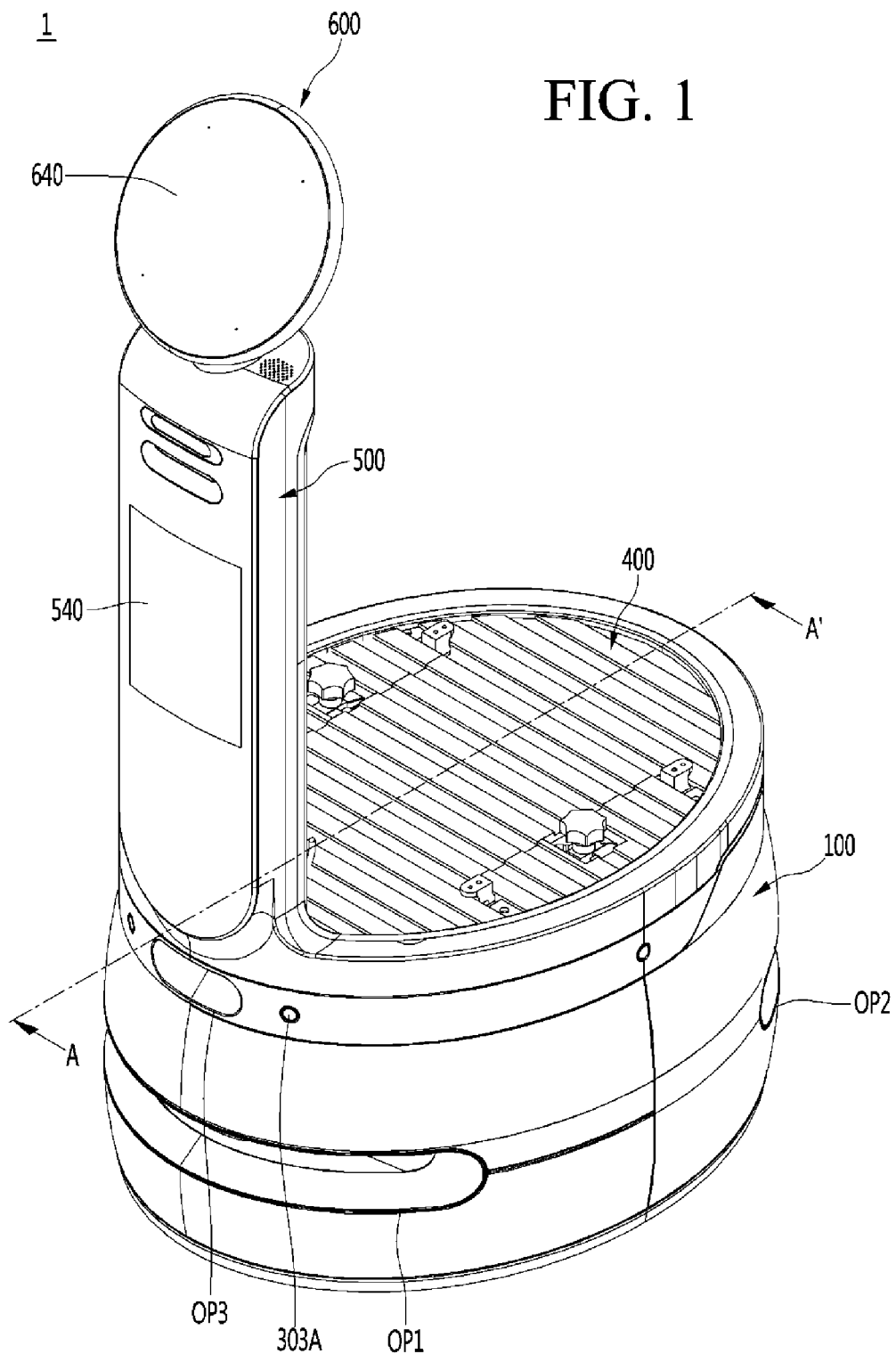
FIG. 1 is a perspective view of a robot according to an embodiment.
Figure 2:
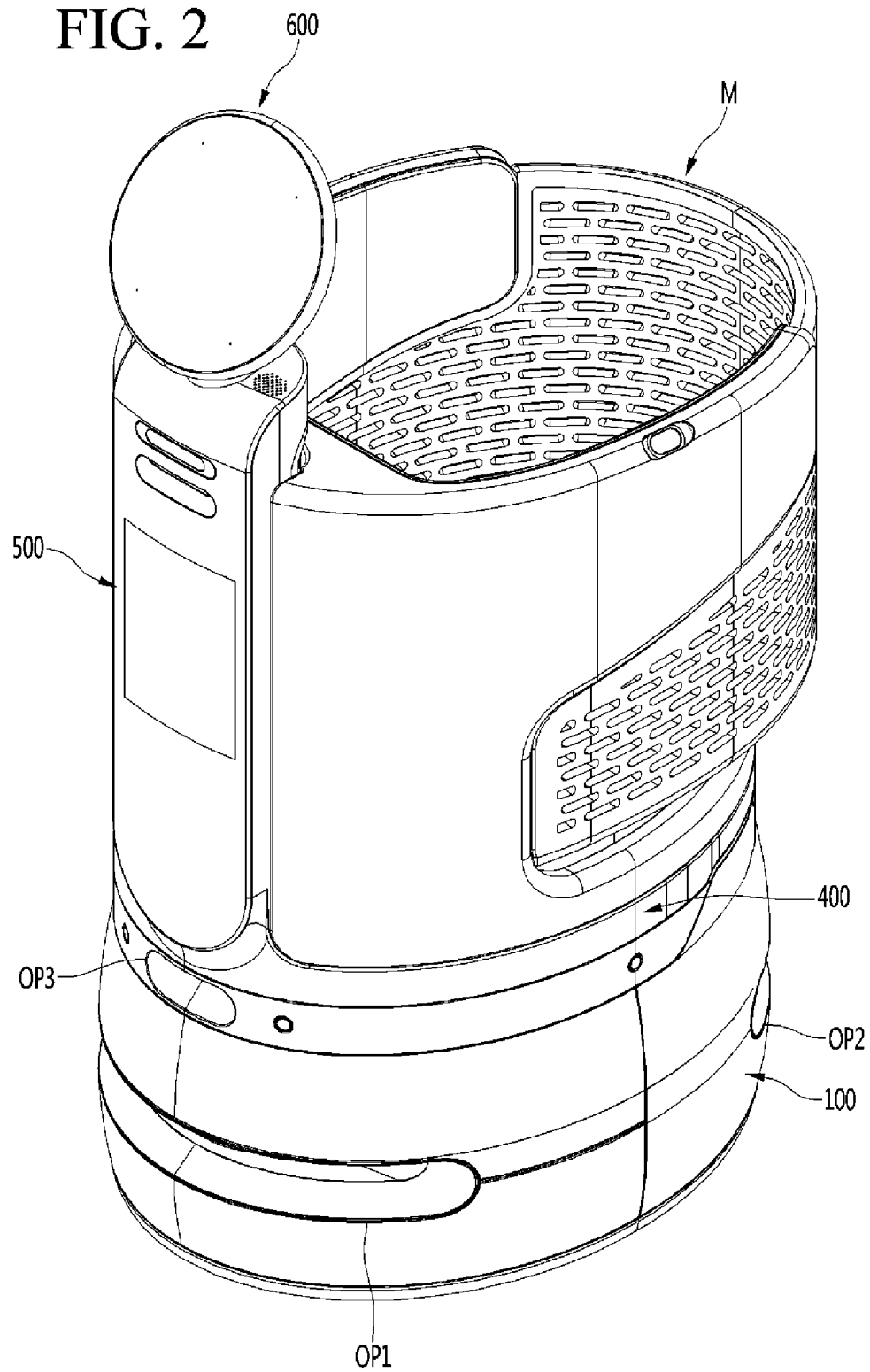
FIG. 2 is a perspective view of the robot of FIG. 1, on which a service module is mounted, according to an embodiment.
Figure 3:
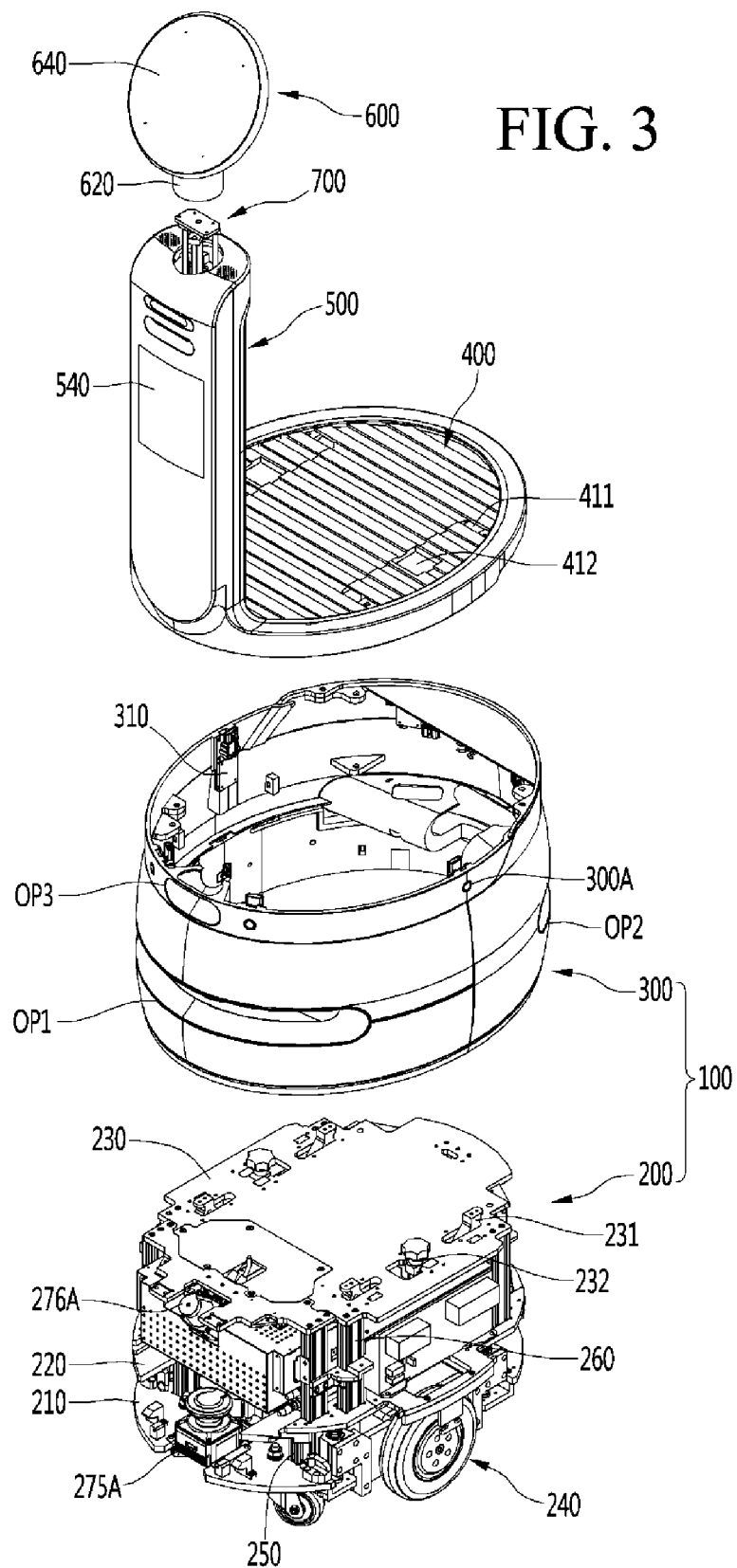
FIG. 3 is an exploded perspective view of the robot according to an embodiment.

Hereinafter, specific embodiments of a robot (also referred to herein as a modular movable robot) 1 will be described in detail with reference to the accompanying drawings. FIG. 1 is a perspective view of robot 1 according to an embodiment, FIG. 2 is a perspective view of the robot 1 on which a service module M is mounted, and FIG. 3 is an exploded perspective view of the robot 1 according to an embodiment. Robot 1 according to an embodiment may include a main body 100, a traveling unit 240, a module supporting plate 400, display units 500 and 600, and a rotation mechanism 700.

The main body 100 may constitute the primary structure of the robot 1. The length of the main body 100 in a first horizontal (e.g., front-rear) direction may be longer than the width of the main body 100 in a second horizontal (e.g., left-right) direction that crosses the first horizontal direction. For example, a cross-section of the main body 100 in a substantially horizontal plane (e.g., a plane parallel to a surface on which the robot 1 is travelling) may have a substantially elliptical shape. In another example, a cross-section of the main body 100 in a horizontal plane may have a substantially ovoid (e.g., egg-like) shape The main body 100 may include an inner module 200 and a housing 300 surrounding the inner module 200. The inner module 200 may be disposed inside the housing 300. The traveling unit 240 may be provided below the inner module 200.

The inner module 200 may include a plurality of plates and a plurality of frames. For example, the inner module 200 may include a lower plate 210, an upper plate (also referred to as an intermediate or support plate) 220 disposed on the upper side of the lower plate 210, and a top plate 230 disposed on the upper side of the upper plate 220. In addition, the inner module 200 may further include a plurality of lower supporting frames (or lower support posts) 250 and a plurality of upper supporting frames (or upper support posts) 260.

The lower plate 210 may form the bottom surface of the main body 100. The lower plate 210 may be referred to as a base plate. The lower plate 210 may be substantially flat. The lower plate 210 may be coupled to or receive the traveling unit 240.

The upper plate 220 may be spaced above the lower plate 210. The upper plate 220 may be referred to as a middle plate. The upper plate 220 may be substantially flat. The upper plate 220 may be disposed between the lower plate 210 and the top plate 230 in a vertical direction.

The lower supporting frame 250 may be disposed between the lower plate 210 and the upper plate 220. The lower supporting frame 250 may be elongated in the vertical direction. The lower supporting frame 250 may support the upper plate 220 at its lower side.

The top plate 230 may form the top surface of the main body 100. The top plate 230 may be spaced above the upper plate 220. For example, the upper supporting frame 260 may be disposed between the upper plate 220 and the top plate 230. The upper supporting frame 260 may be elongated in the vertical direction. The upper supporting frame 260 may support the top plate 230 at its lower side.

The housing 300 may form the outer circumferential surface of the main body 100. A space in which the inner module 200 is disposed may be formed in the housing 300. The top surface and the bottom surface of the housing 300 may be opened.

The housing 300 may surround the edges of the lower plate 210, the upper plate 220, and the top plate 230. In this example, the inner circumference of the housing 300 may contact the side edges of each of the lower plate 210, the upper plate 220, and the top plate 230, but is not limited thereto.

A front opening OP1 may be formed in the front portion of the housing 300. The front opening OP1 may be opened toward the front side of robot 1. The front opening OP1 may be elongated along the circumferential direction of the housing 300. A front light detection and ranging (lidar) sensor 275A or other type of sensor may detect an obstacle or the like positioned in front of the robot 1 through the front opening OP1, or collect data to form a map of the region in front of the robot 1.

A rear opening OP2 may be formed in the rear portion of the housing 300. The rear opening OP2 may be opened toward the rear side of robot 1. The rear opening OP2 may be elongated along the circumferential direction of the housing 300. A rear lidar sensor 275B (see FIG. 4) or other type of sensor may detect an obstacle or the like positioned behind the robot 1 through the rear opening OP2, or may map the rear region of the robot 1. In addition, a backcliff sensor 276B (see FIG. 4) may detect a cliff, drop-off, or other hazard behind the robot 1 via the rear opening OP2.

An upper opening OP3 may be formed in the front side of the housing 300. The upper opening may be formed above the front opening OP1. The upper opening OP3 may be opened toward the front side or the front lower side. The cliff sensor 276A may detect a cliff, drop-off, or other type of hazard in front of the robot 1 through the upper opening OP3.

The housing 300 may have a plurality of openings 303A. More specifically, the openings 303A may be formed on an upper portion of the housing 300. The plurality of openings 303A may be spaced apart from each other along the circumferential direction of the housing 300. Ultrasonic sensor 310 or other type of object sensors may detect an object around the robot 1 via the openings 303A.

The housing 300 may include a material having a first thermal conductivity, and the inner module 200 may include a material having a second thermal conductivity higher than the first thermal conductivity. In more detail, at least one of the lower plate 210, the upper plate 220, the top plate 230, the lower supporting frame 250, or the upper supporting frame 260 may include a material having a second thermal conductivity higher than the first thermal conductivity. For example, the housing 300 may include an injection plastic material, and at least one of the lower plate 210, the upper plate 220, the top plate 230, the lower supporting frame 250, or the upper supporting frame 260 may include a metal material such as aluminum.

Therefore, heat generating components disposed in the inner module 200 may be smoothly dissipated by conduction via the higher thermal conductivity material. At the same time, it is possible to prevent the housing 300, which forms the appearance of the main body 100, from becoming hot (e.g., to be heated above a threshold temperature) due to the low thermal conductivity material.

The traveling unit 240 may drive a movement of the robot 1. The traveling unit 240 may be provided at the lower portion of the main body 100. For example, the traveling unit 240 may be provided on the lower plate 210. The detailed configuration of the traveling unit 240 will be described later in detail.

The module supporting plate 400 may be mounted on the top surface of the main body 100. The module supporting plate 400 is preferably a horizontal plate-shaped member, but is not limited thereto. Like the main body 100, the module supporting plate 400 may have a longitudinal length longer than the horizontal width of the module supporting plate 400. For example, the module supporting plate 400 may support a service module M from the lower side. For example, the service module M may be seated and supported on the module supporting plate 400.

The service module M may be detachably mounted on the module supporting plate 400. In this case, the robot 1 of the present disclosure may be referred to as a "mobile module carrying robot", and the entire structure including the mobile module 1 and the service module M may be referred to as a "modular movable robot". However, in order to avoid confusion in the description, these names are not used below.

The service module M may be an object to be carried by the robot 1 and types of the service module M are not limited. Therefore, it should be appreciated that different service modules M may be mounted on the same robot 1 and used to enable different types of services to be performed by robot 1. For example, the service module M shown in FIG. 4 may be associated with a cart capable of holding goods. In this case, the robot 1 equipped with the cart-type service module M may be used in a market, and the user would not have to push the cart directly since the robot 1 could perform travelling within the market.

The top surface of the main body 100, that is, the top plate 230 may include at least one module guide 231 for guiding the installation position of the service module M and at least one module fastening portion 232 for fastening the service module M. The module guide 231 and the module fastening portion 232 may protrude upward from the top plate 230.

The module guide 231 may pass through a sub throughhole 411 formed in the module supporting plate 400, may guide the installation position of the service module M, and may prevent the service module M from shaking or otherwise moving unintentionally in a horizontal direction.

The module fastening portion 232 may pass through sub-opening holes 412 formed in the module supporting plate 400 and may be fastened to the service module M. Therefore, the service module M may be firmly mounted on the upper side of the module supporting plate 400. The module guide 231 and/or the module fastening portion 232 may provide surfaces that may be used as grips when a user is carrying the robot 1.

One or more display units 500 and 600 may be disposed above the front portion of the main body 100. The display units 500 and 600 may be elongated in the vertical direction. The height HD of the display units 500 and 600 (see FIG. 4) above a top region of main body 100 may be greater than the height HB of the main body 100 from a floor or other surface on which the robot 1 travels.

In one configuration, the display units 500 and 600 may include a body display unit 500 and a head display unit 600. The body display unit 500 may be integrally formed with the module supporting plate 400 to form a single unit. In this example, the body display unit 500 may extend upward from the front end of the module supporting plate 400. However, the body display unit 500 and the module supporting plate 400 may be formed as separate members in other examples.

The body display unit 500 may be positioned at a location that is higher than a top surface of the main body 100. The body display unit 500 may include a body display 540 provided on the front surface thereof. The body display 540 may operate as an output unit for displaying an image or a video. At the same time, the body display 540 may operate as an input unit including a touch screen and capable of receiving touch input or detecting a proximity or a pointer device.

The body display unit 500 may be disposed in front of the service module M mounted on the module supporting plate 400. For example, a groove corresponding to the shape of the body display unit 500 may be formed on the front portion of the service module M, and the body display unit 500 may be inserted into the groove. For example, the body display unit 500 may guide the mounting position of the service module M.

The head display unit 600 may be disposed above the body display unit 500. The head display unit 600 may be rotatably connected to the upper portion of the body display unit 500. For example, the head display unit 600 may include a neck housing 620 that is rotatably connected to the body display unit 500. The rotation mechanism 700 to rotate the head display unit 600 may be provided in the inside of the neck housing 620.

The head display unit 600 may include a head display 640 provided on the front side. The head display unit 600 may be directed toward the front side or the front upward side. The head display 640 may display an image or a video showing a human facial expression. Therefore, the user may perceive that the head display unit 600 is similar to a head of a person.

The head display unit 600 may rotate in a predetermined range (for example, 180 degrees) to the left and right with respect to a vertical rotational shaft similar to a head of a person. The rotation mechanism 700 may rotate the head display unit 600 with respect to the body display unit 500. The rotation mechanism 700 may include, for example, a rotary motor (not shown) and a rotational shaft rotated by the rotary motor. The rotary motor may be disposed inside the body display unit 500, and the rotational shaft may extend from the inside of the body display unit 500 to the inside of the neck housing 620 and may be connected to the head display unit 600.

Figure 4:
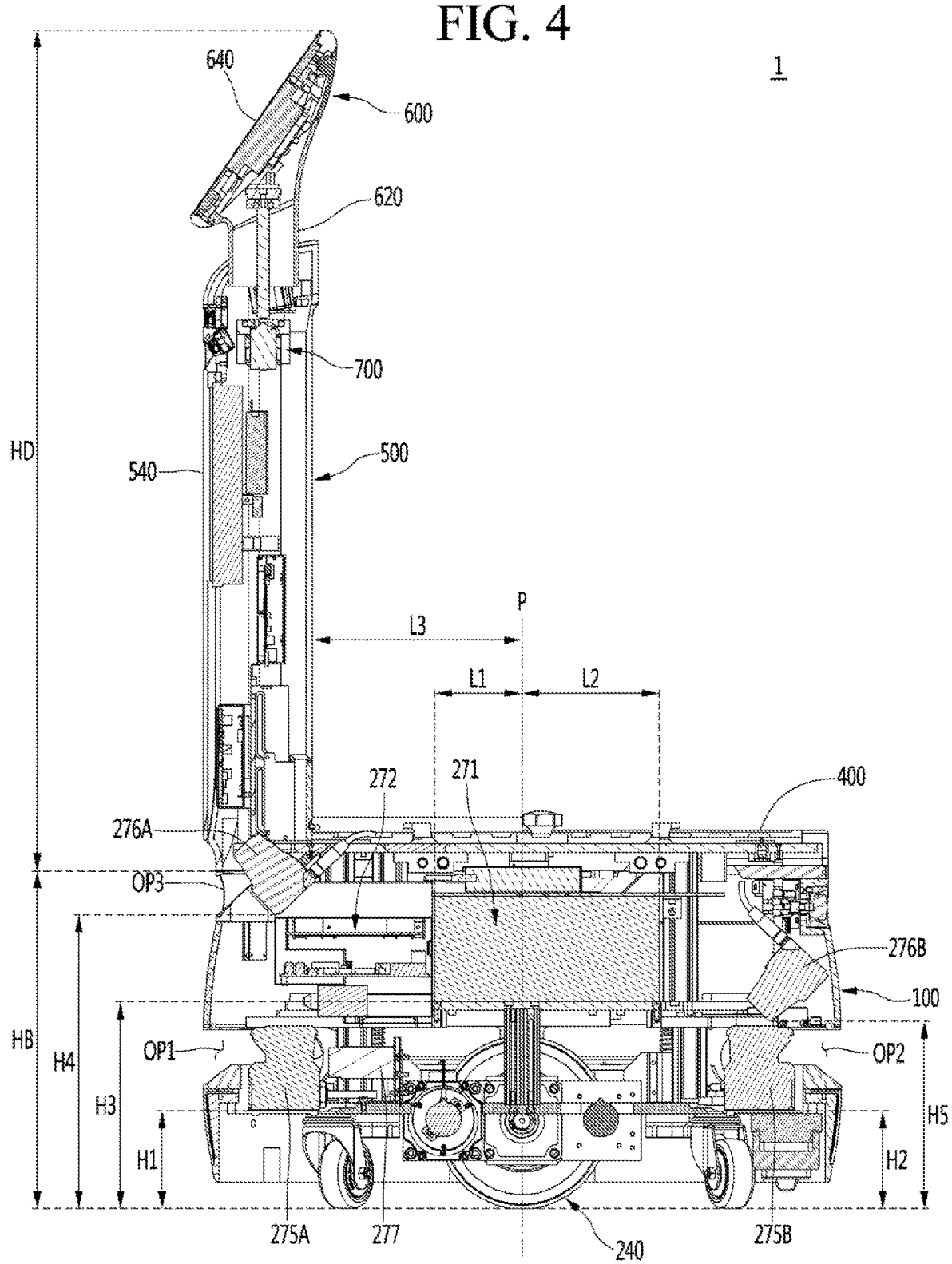
FIG. 4 is a cross-sectional view of the robot of FIG. 1 taken along line A-A' according to an embodiment.

FIG. 4 is a cross-sectional view of the robot 1 according to one implementation and taken along line A-A' of FIG. 1. A battery 271 and a control box 272 may be incorporated in the main body 100. In addition, the main body 100 may include the front lidar (or other front sensor) 275A and the rear lidar (or other rear sensor) 275b.

The battery 271 may store power for operation of the robot 1. The battery 271 may overlap a vertical plane P that crosses the midpoints left and right with respect to the longitudinal length of the main body 100 in a front-back horizontal direction.

The battery 271 may be eccentrically disposed rearward from the inside of the main body 100. For example, the front-rear distance L2 between the vertical plane P and the rear surface of the battery 271 may be longer than the front-rear distance L1 between the vertical plane P and the front surface of the battery 271.

In addition, the body display unit 500 may be disposed in front of the vertical plane P. The front-rear distance L3 between the vertical plane P and the body display unit 500 may be longer than the front-rear distance L1 between the vertical plane P and the front surface of the battery 271. For example, the body display unit 500 may not overlap the battery 271 in the vertical direction.

With this configuration, the load of the battery 271 and the loads of the body display unit 500 and the head display unit 600 may be balanced. For example, a center of gravity of the robot 1 may be disposed on the vertical plane P, or may be disposed adjacent to (e.g., within a threshold distance of) the vertical plane P. Therefore, it may be possible to prevent the robot 1 from being inclined forward or backward or overturning.

The control box (or controller) 272 may be disposed in front of the battery 271. At least part of the control box 272 may overlap the display units 500 and 600 in the vertical direction. The control box 272 may include a box-shaped boxing case and a controller provided inside the boxing case. A plurality of through-holes may be formed in the boxing case to dissipate heat inside the control box 272. The controller may include a printed circuit board (PCB) or other circuitry and may control the overall operation of the robot 1.

Since the control box 272 is disposed in front of the battery 271, the load of the backwardly eccentric battery 271 and the load of the control box 272 may be balanced. Therefore, it may be possible to prevent the robot 1 from being inclined forward or backward or overturning.

The front lidar 275A and the rear lidar 275B may be provided on the front and rear portions of the main body 100, respectively. The lidar is a sensor that may detect the distance to an object and may further detect various physical properties of the object by irradiating a laser and analyzing a reflection of the laser from the object. For example, the front lidar 275A and the rear lidar 275B may detect nearby objects, geographic features, and the like. The controller of the control box 272 may receive information detected by the front lidar 275A and the rear lidar 275B, may perform three-dimensional (3D) mapping based on the information, and may control the traveling unit 240 such that the robot 1 avoids an obstacle.

As described above, the front lidar 275A may detect information about the front region of the robot 1 through the front opening OP1 formed in the front portion of the main body 100. The rear lidar 275B may detect information about the rear region of the robot 1 through the rear opening OP2 formed in the rear portion of the main body 100.

At least part of the front lidar 275A may be disposed below the control box 272. The front lidar 275A and rear lidar 275B may be disposed at the same height in the main body 100. For example, the vertical distance H1 from a travel surface under the robot 1 to the front lidar 275A may be equal to the vertical distance H2 from the travel surface to the rear lidar 275b.

In addition, the front lidar 275A and the rear lidar 275B may be disposed at a position lower than the battery 271 in the main body 100. For example, a vertical distance H3 from the travel surface to a bottom surface of the battery 271 may be greater than the vertical distance H1 from the travel surface to a bottom surface of the front lidar 275A. In addition, the vertical distance H3 from the travel surface to the bottom surface of the battery 271 may be greater than the vertical distance H2 from the travel surface of the main body 100 to a bottom surface of the rear lidar 275B.

This positioning of the lidars 275*a* and 275*b* may allow the space in the main body 100 to be more efficiently utilized as compared with the case where the front lidar 275A and the rear lidar 275B are disposed at the same height as the battery 271. For example, the battery 271 may vertically overlap respective portions of the front lidar 275A and the rear lidar 275B. Therefore, the size of the main body 100 may be made compact in lateral directions along a horizontal plane.

A cliff sensor 276A and a backcliff sensor 276B may be incorporated in the main body 100. The cliff sensor 276*a* and the backcliff sensor 276B may monitor a travel surface and may detect the presence or absence of a cliff on the travel surface by transmitting and receiving infrared (IR) rays. For example, the cliff sensor 276A and the backcliff sensor 276B may scan the travel surface at, respectively, a region in front of the robot 1 and a region behind the robot 1 and detect the presence or absence of cliffs. The controller of the control box 272 may receive information detected by the cliff sensor 276A and backcliff sensor 276B, and may control the traveling unit 240 based on the information such that the robot 1 avoids any detected cliffs.

As described above, the cliff sensor 276A may detect attributes of the travel surface in front of the robot 1 via the upper opening OP3. The backcliff sensor 276B may detect the travel surface behind the robot 1 via the rear opening OP2. In one example, the cliff sensor 276A may be disposed above the front lidar 275A. Similarly, the backcliff sensor 276B may be disposed above the rear lidar 2766.

At least part of the cliff sensor 276A may be disposed above the control box 272. The backcliff sensor 276B may be disposed behind the battery 271. For example, the cliff sensor 276A may be disposed at a position higher than the backcliff sensor 276B in the main body 100.

For example, a vertical distance H4 from the travel surface under robot 1 to the cliff sensor 276A may be greater than the vertical distance H5 from the travel surface to the backcliff sensor 276B. Therefore, the space in the main body 100 may be efficiently utilized as compared with the configuration in which the cliff sensor 276A is disposed in front of the control box 272. Therefore, the main body 100 may be made more compact in the front-rear direction.

However, the present disclosure is not limited thereto and at least one of the cliff sensor 276A or the backcliff sensor 276B may be replaced by another type of sensor. For example, robot 1 may include ultrasonic or lidar sensor to monitor for cliffs in the travel surface.

In certain configurations, the main body 100 may have a wiring cut-off switch 277 incorporated therein. The wiring cut-off switch 277 may turn off the power of the robot 1 and immediately stop the driving of the robot 1. The wiring cut-off switch 277 may be disposed behind the front lidar 275A. In addition, the wiring cut-off switch 277 may be disposed in front of the vertical plane P.

In one configuration, the wiring cut-off switch 277 may be disposed further adjacent to the front lidar 275A than the vertical plane P. Therefore, the operator may separate the housing 300 and the front lidar 275A from the main body 100 and easily access the wiring cut-off switch 277.

Figure 5:
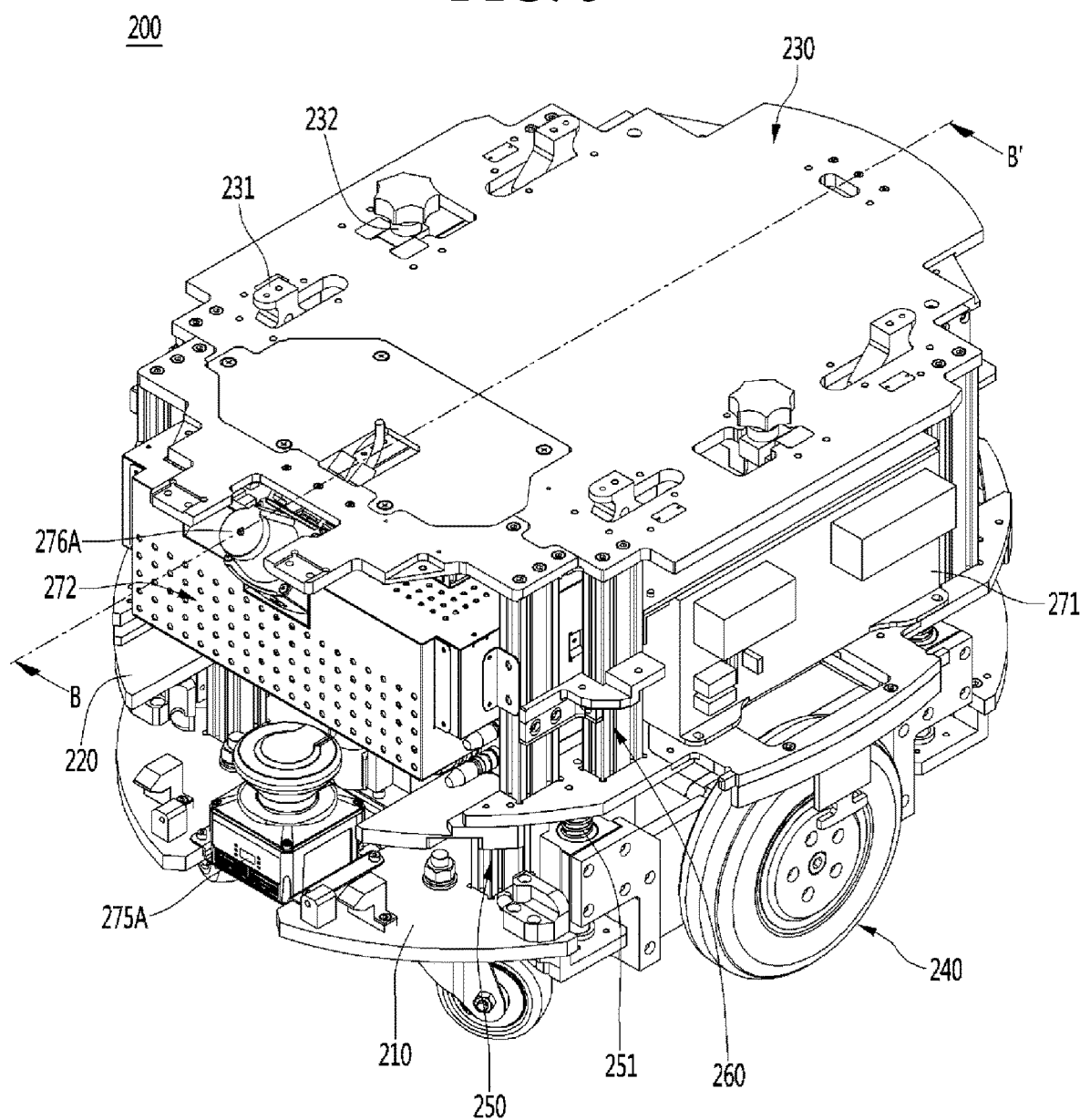
FIG. 5 is a perspective view of an inner module of the robot of FIG. 1 according to an embodiment.
Figure 6:
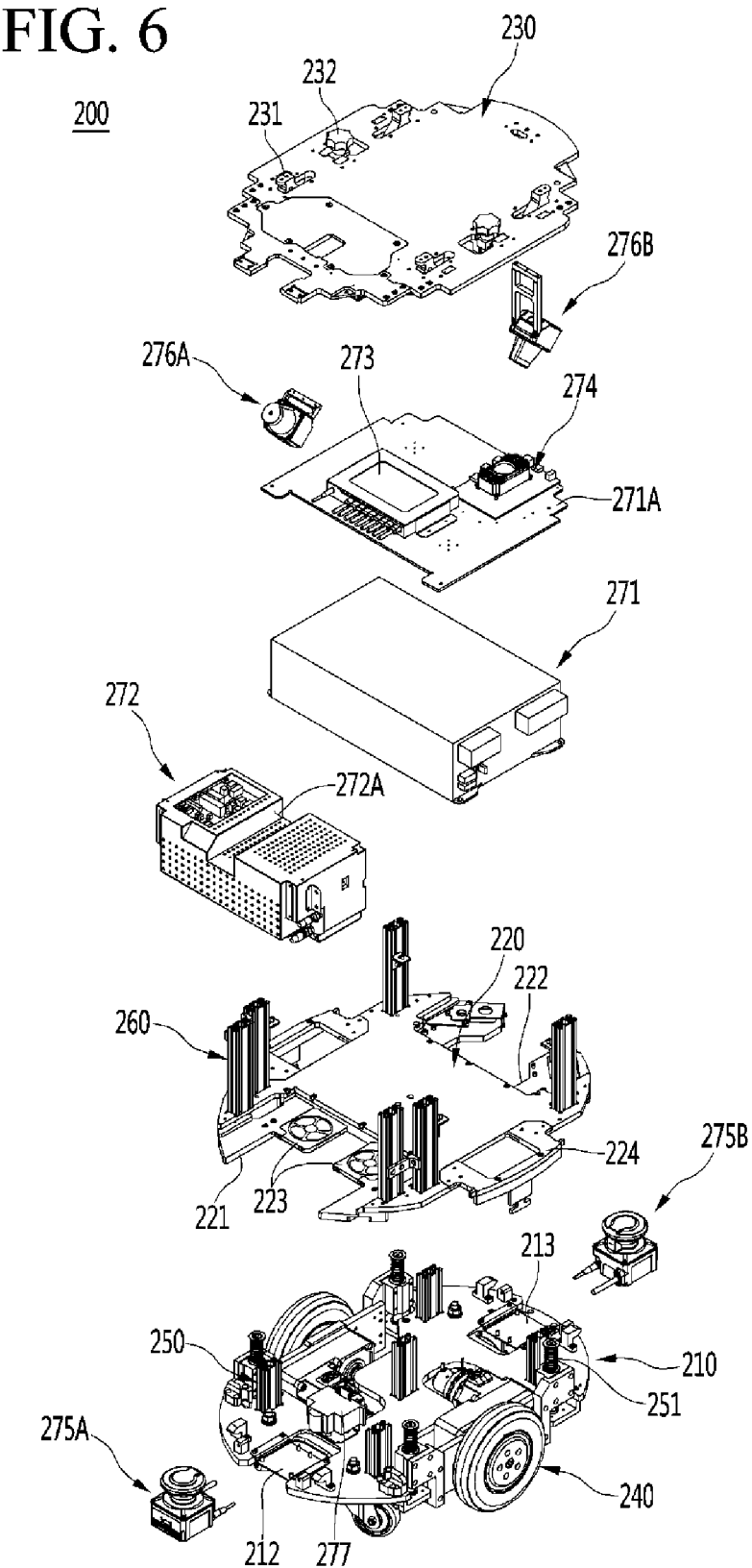
FIG. 6 is an exploded perspective view of the inner module of the robot of FIG. 1 according to an embodiment.
Figure 7:
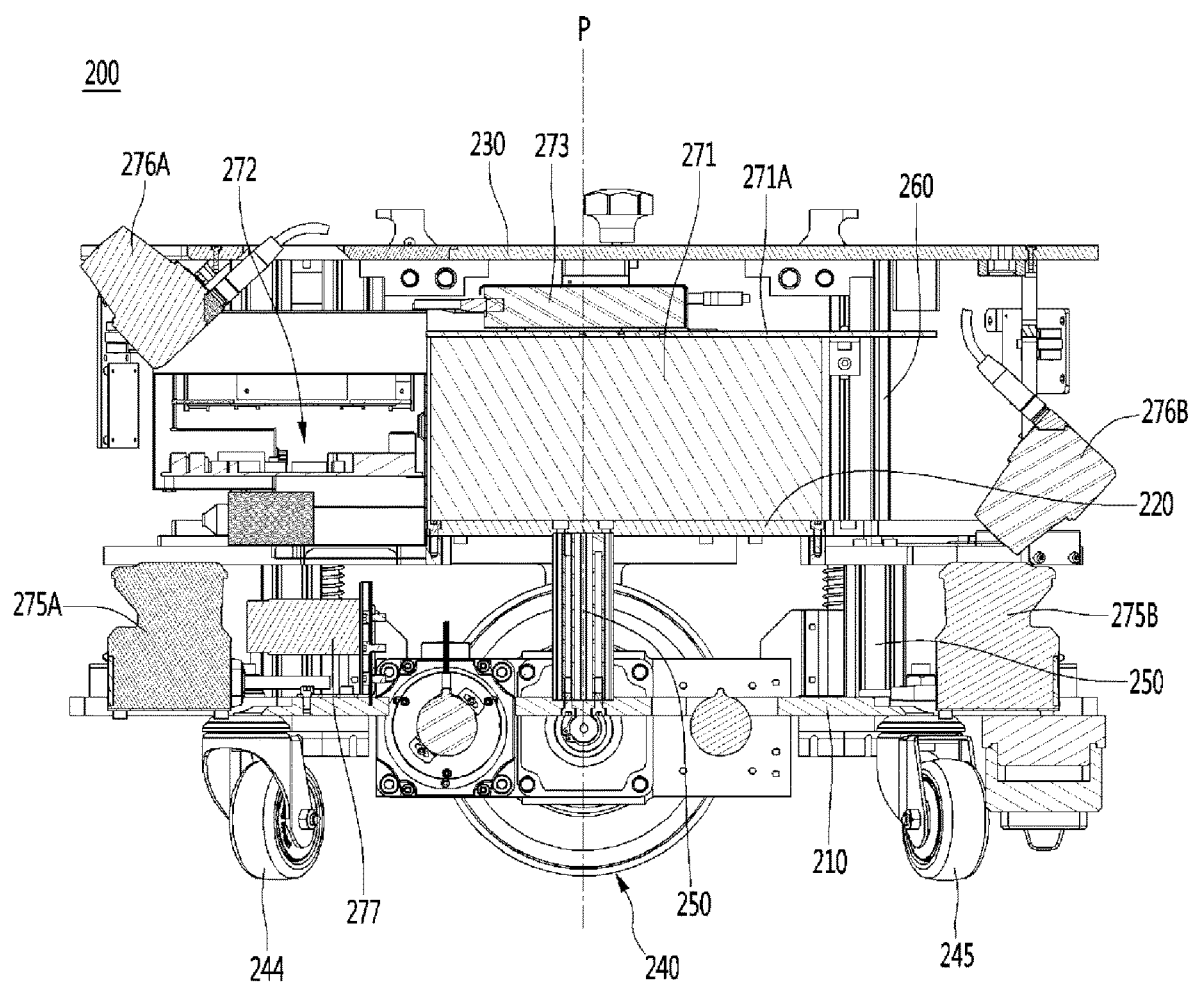
FIG. 7 is a cross-sectional view of the inner module of FIG. 5 taken along line B-B'.

FIG. 5 is a perspective view of the inner module 200 according to an embodiment, FIG. 6 is an exploded perspective view of the inner module 200 according to an embodiment, and FIG. 7 is a cross-sectional view of the inner module 200 taken along line B-B' of FIG. 5. As described above, the inner module 200 may include the lower plate 210, the upper plate 220 spaced upward from the lower plate 210, and the top plate 230 spaced upward from the upper plate 220. In addition, the inner module 200 may further include a plurality of lower supporting frames 250 and a plurality of upper supporting frames 260. The lower plate 210 may form the bottom surface of the main body 100. The lower plate 210 may include the traveling unit 240.

A front lidar mounting portion 212 on which the front lidar 275A is mounted may be formed on the front side of the lower plate 210, and a rear lidar mounting portion 213 on which the rear lidar 275B is mounted may be formed on the rear side of the lower plate 210. The front lidar 275A may be provided on the upper portion of the front side of the lower plate 210, and the rear lidar 275B may be provided on the upper portion of the rear side of the lower plate 210. For example, the front lidar 275A and the rear lidar 275B may be disposed between the lower plate 210 and the upper plate 220.

The wiring cut-off switch 277 may be provided on the lower plate 210. The wiring cut-off switch 277 may be provided on the top surface of the lower plate 210, and may be disposed behind the front lidar 275A.

The lower plate 210 may be coupled to the lower supporting frame 250. The lower supporting frame 250 may extend upward from the top surface of the lower plate 210 in a lengthwise manner. A plurality of lower supporting frames 250 may be provided above the lower plate 210.

A shock absorber 251 including a spring may be provided on the lower plate 210. A plurality of shock absorbers 251 may be provided. The shock absorber 251 may be disposed between the lower plate 210 and the upper plate 220 and may absorb shocks and vibrations in the vertical direction due to the traveling of the robot 1. In one example, the upper plate 220 may be supported by the lower supporting frame 250 and the shock absorber 251.

A front cutout portion (or front cutout) 221 and a rear cutout portion (or rear cutout) 222 may be formed in the upper plate 220. The front cutout portion 221 may be formed by cutting the front side of the upper plate 220. The front cutout portion 221 may prevent interference between the upper plate 220 and the front lidar 275A. In addition, the front cutout portion 221 may prevent interference between the upper plate 220 and a heat dissipating fan 223.

The rear cutout portion 222 may be formed by cutting the rear side of the upper plate 220. The rear cutout portion 222 may prevent interference between the upper plate 220 and the rear lidar 275B. In addition, the rear cutout portion 222 may prevent interference between the upper plate 220 and the backcliff sensor 276B. The main body 100, more specifically, the inner module 200 may be made compact in the vertical direction by the front cutout portion 221 and the rear cutout portion 222.

At least one heat dissipating fan 223 may be provided on the upper plate 220. The heat dissipating fan 223 may be disposed below the control box 272. The heat dissipating fan 223 may be provided inside the front cutout portion 221.

Since a plurality of through-holes are formed on the outer surface of the control box 272, hot air in the control box 272 may be suctioned by the heat dissipating fan 223 via the through-holes, and the air suctioned by the heat dissipating fan 223 may be discharged to the outside of the main body 100 via the front opening OP1. Therefore, the heat dissipation of the control box 272 may be facilitated.

The upper plate 220 may have housing connection portions (or housing connection surfaces) 224 connected to the housing 300. The housing connection portions 224 may be formed on the left and right edges of the upper plate 220, respectively. The housing connection portion 224 may be connected to the inner circumference of the housing 300.

The battery 271 may be provided on the upper plate 220. The battery 271 may be seated on the top surface of the upper plate 220. For example, the battery 271 may be disposed between the upper plate 220 and the top plate 230. In one example, a front-rear distance between a front end of the upper plate 220 and the front surface of the battery 271 may be longer than a front-rear distance between a rear end of the upper plate 220 and the rear surface of the battery 271.

The printed circuit board (PCB) 274 and the communication module 273 may be disposed between the top surface of the battery 271 and the bottom surface of the top plate 230. For example, a support panel 271A may be provided on the top surface of the battery 271, and the communication module 273 and the PCB 274 may be disposed on the top surface of the support panel 271A. The communication module 273 and the PCB 274 may be directly disposed on the top surface of the battery 271.

The communication module 273 and the PCB 274 may be electrically connected to the control box 272. The communication module 273 may communicate with the outside of the robot 1. The type of the communication module 273 is not limited. For example, the communication module 273 may include at least one of a WIFI® module, a Bluetooth® module, a LAN communication module, a WAN communication module, or a module for communicating via other wired or wireless protocols.

The PCB 274 may constitute a central processing unit (CPU) of the robot 1. The PCB 274 may include a navigation module to control the traveling path of the robot 1. For example, the PCB 274 may include various software and/or hardware to control a movement of the robot 1 based on detected obstacles and a function to be performed by the robot 1. In addition, the PCB 274 may control the contents displayed on the body display unit 500 and the head display unit 600. Since the communication module 273 and the PCB 274 are disposed outside the control box 272, a harness connection is facilitated and heat generating components may be arranged in a distributed manner.

The upper plate 220 may be provided with the control box 272. The control box 272 may be seated on the top surface of the upper plate 220, may be disposed in front of the battery 271, and may be disposed on the top side of the heat dissipating fan 223. The control box 272 may be disposed between the upper plate 220 and the top plate 230.

The control box 272 may be electrically connected to the front lidar 275A, the rear lidar 275B, the cliff sensor 276A, the backcliff sensor 276B, and the plurality of ultrasonic sensors 310 (see FIG. 3). Therefore, the control box may receive information detected from the front lidar 275A, the rear lidar 275B, the cliff sensor 276A, the backcliff sensor 276B, and the plurality of ultrasonic sensors 310.

In addition, the control box 272 may be electrically connected to the battery 271 and the traveling unit 240. Therefore, the control box 272 may manage connections such that power stored in the battery 271 is selected transmitted to components of the robot 1, and may control the driving of the traveling unit 240, such as by managing the transmission of the power stored in the battery 271 to a motor in the traveling unit 240.

A recessed portion (or recess) 272A recessed downward may be formed on the top surface of the control box 272. The recessed portion 272A may prevent interference between the cliff sensor 276A and the control box 272. For example, at least part of the cliff sensor 276A may be disposed at the recessed portion 272A.

The upper plate 220 may be provided with the upper supporting frame 260. The upper supporting frame 260 may extend upward from the top surface of the upper plate 220 in a lengthy manner. A plurality of upper supporting frames 260 may be provided.

The top plate 230 may form the top surface of the main body 100. The top plate 230 may be supported by the upper supporting frame 260. The top plate 230 may be coupled to the cliff sensor 276A and the backcliff sensor 276B. For example, the cliff sensor 276A and the backcliff sensor 276B may be supported by being suspended on the bottom surface of the top plate 230. Therefore, the cliff sensor 276A and the backcliff sensor 276B may be disposed between the top plate 230 and the upper plate 220.

The top plate 230 may be coupled to and support at least one of the module guide 231 or the module fastening portion 232. A plurality of module guides 231 and a plurality of module fastening portions 232 may be provided. For example, one pair of module fastening portion 232 may be provided on the left and right sides of the top plate 230. The module guide 231 may include a pair disposed on the left side of the top plate 230 and a pair positioned on the right side thereof. For example, the module fastening portion 232 may be disposed between the pair of module guides 231 in the front-rear direction.

Figure 8:
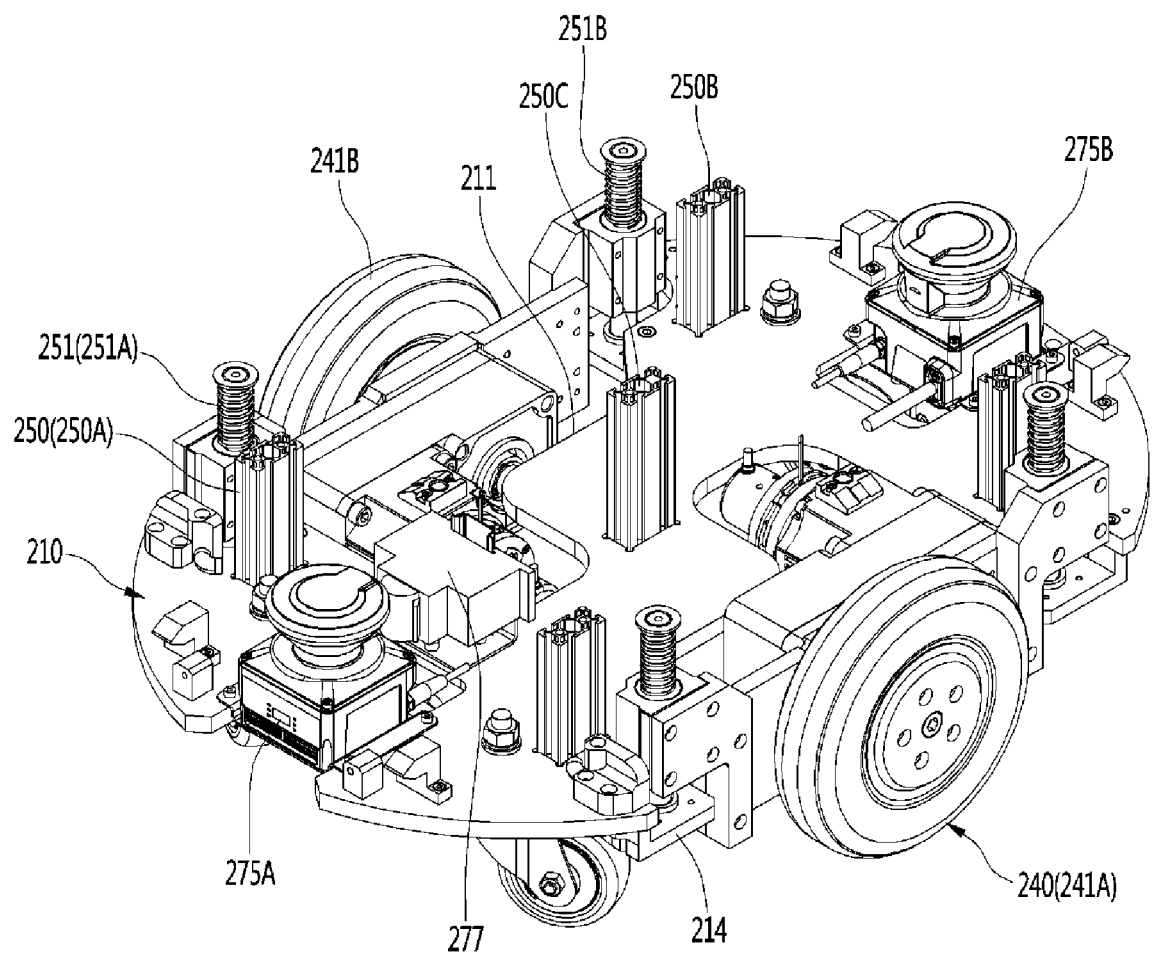
FIG. 8 is a perspective view of a lower plate of the robot of FIG. 1 according to an embodiment.
Figure 9:
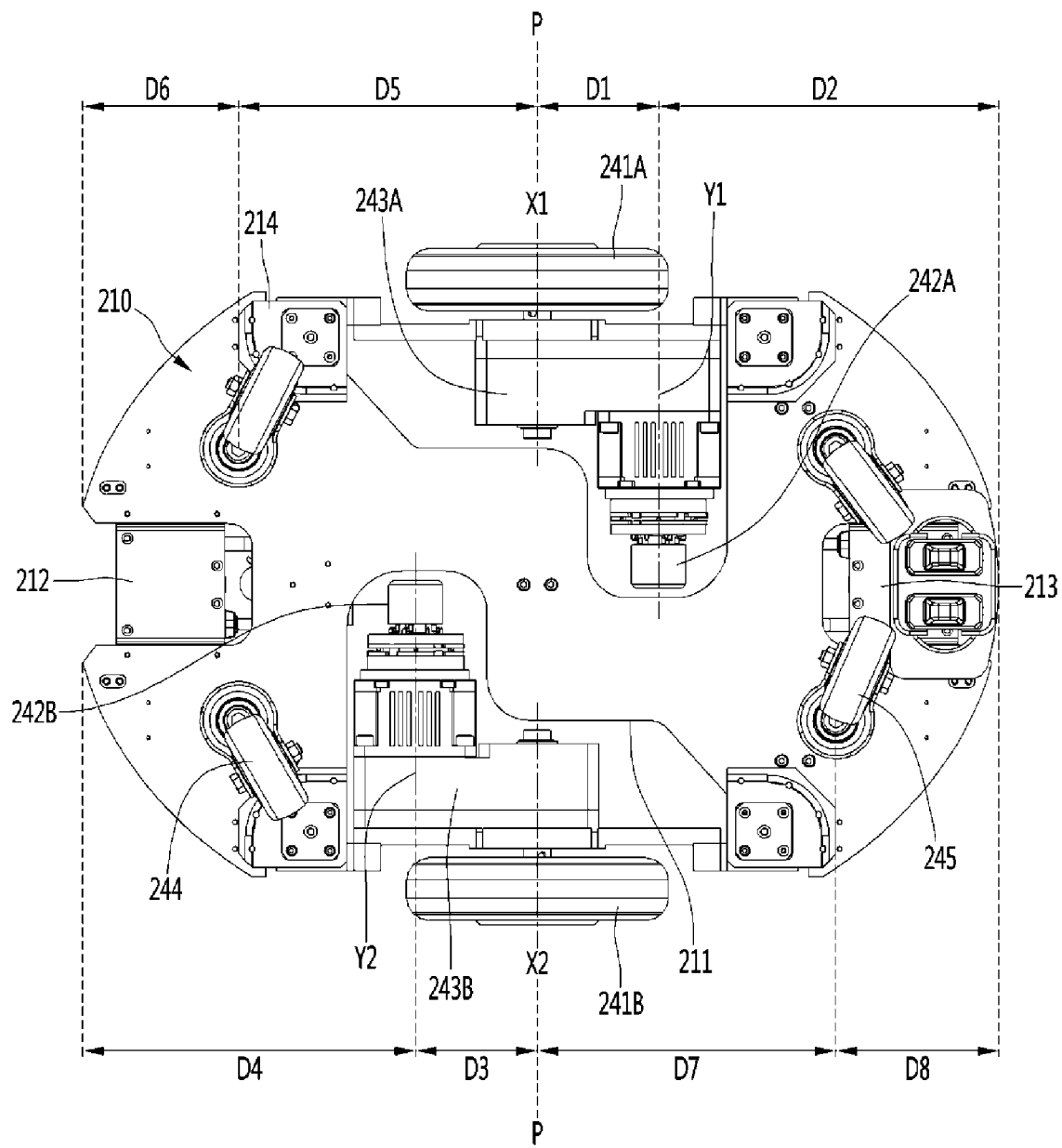
FIG. 9 is a bottom view of the lower plate of FIG. 8 according to an embodiment.

FIG. 8 is a perspective view of the lower plate 210 according to an embodiment, and FIG. 9 is a bottom view of the lower plate 210 according to an embodiment. The lower plate (or support plate) 210 may be made of a single plate member or a combination of a plurality of plate members.

The lower plate 210 may be provided with a driving unit avoiding portion (or driving unit cutout) 211 for preventing interference between the lower plate 210 and the traveling unit 240. The driving unit avoiding portion 211 may be formed on the left and right sides of the lower plate 210, respectively. More specifically, the driving unit avoiding portion 211 may prevent the driving motors 242A and 242B and the power transmission units 243A and 243B from interfering with the lower plate 210. Therefore, as compared with the case where the entire traveling unit 240 is provided below the lower plate 210, the main body 100 may be made compact in the vertical direction.

The plurality of lower supporting frames 250 provided on the top surface of the lower plate 210 may include a first lower supporting frame 250A provided in front of the lower plate 210, a second lower supporting frame 250B provided in rear of the lower plate 210, and a third lower supporting frame 250C disposed below the battery 271 (see FIG. 7). For example, the lower plate 210 may include a pair of first lower supporting frames 250A, a pair of second lower supporting frames 250B, and one third lower supporting frame 250C.

The first lower supporting frame 250A may support the front side of the upper plate 220 from the lower side. The first lower supporting frame 250A may be positioned in front of a vertical plane P (see FIG. 7) that crosses the midpoints left and right with respect to the longitudinal length of the main body 100 in front-back direction.

The second lower supporting frame 250B may support the rear side of the upper plate 220 from the lower side. The second lower supporting frame 250B may be disposed at the rear side of (e.g., behind) the vertical plane P.

The third lower supporting frame 250C may prevent the upper plate 220 from sagging due to the load of the battery 271. A portion of the third lower supporting frame 250C may be disposed on the vertical plane P.

The shock absorber supporting portion (or shock absorber receiving surface) 214 for supporting the shock absorber 251 from the lower side may be formed on the lower plate 210. A plurality of shock absorber supporting portions 214 may be formed.

The plurality of shock absorbers 251 may include a front shock absorber 251A provided at the front side of the lower plate 210 and a rear shock absorber 251B provided at the rear side of the lower plate 210. For example, the lower plate 210 may be provided with a pair of front shock absorbers 251A and a pair of rear shock absorbers 250B. The front shock absorber 250A may be disposed in front of the vertical plane P (see FIG. 7), and the rear shock absorber 250B may be located behind the vertical plane P.

The driving unit 240 may include driving wheels 241A and 241B for rotating about the driving shafts X1 and X2, driving motors 242A and 242B for rotating the rotational shafts Y1 and Y2 parallel to the driving shafts X1 and X2, and power transmission units 243A and 243B for transmitting the rotational power of the rotational shafts Y1 and Y2 to the driving shafts X1 and X2, For example, the driving unit 240 may include a first driving wheel 241A and a second driving wheel 241B provided on the left and right sides of the lower plate 210, respectively. The first driving wheel 241A may rotate about the first driving shaft X1 and the second driving wheel 241B may rotate around the second driving shaft X2. In this example, the first driving shaft X1 and the second driving shaft X2 may be disposed on a substantially straight line to extend horizontally in a left-right direction.

In addition, the first driving shaft X1 and the second driving shaft X2 may be disposed on the vertical plane P (see FIG. 7). For example, the vertical plane P may extend through the first driving shaft X1 and the second driving shaft X2. For example, the first driving shaft X1 and the second driving shaft X2 may be positioned an substantially equal distance from a front and a rear of the lower plate 210.

The driving unit 240 may include the first driving motor 242A for providing rotational power to the first driving wheel 241A and the second driving motor 242B for providing rotational power to the second driving wheel 241B. The first rotational shaft Y1 rotated by the first driving motor 242A may be separate from and parallel to the first driving shaft X1. For example, the first rotational shaft Y1 is formed in a direction parallel to the first driving shaft X1 and may be spaced apart from the first driving shaft X1. Therefore, as compared with the case where the first rotational shaft Y1 is disposed on the straight line with the first driving shaft X1, the lower plate 210 of the main body 100 may be formed to be compact in a left-right horizontal direction.

The second rotational shaft Y2 rotated by the second driving motor 242B may be separate from and parallel to the second driving shaft X2. For example, the second rotational shaft Y2 may be formed in a direction parallel to the second driving shaft X2 and may be spaced apart from the second driving shaft X2. Therefore, as compared with the case where the second rotational shaft Y2 is disposed on the straight line with the second driving shaft X2, the lower plate 210 of the main body 100 may be formed to be compact in a left-right horizontal direction.

In addition, the first rotational shaft Y1 and the second rotational shaft Y2 may be disposed opposite to each other with respect to the vertical plane P. For example, the first driving motor 242A and the second driving motor 242B may be disposed opposite to each other with respect to the vertical plane P. Therefore, the load or weight of each of the first driving motor 242A and the second driving motor 242B may be balanced with respect to the front-rear direction.

In addition, the first driving motor 242A and the second driving motor 242B may be disposed adjacent to the vertical plane P and may be disposed relatively far from the front end and the rear end of the main body 100. For example, when the first driving motor 242A is disposed behind the vertical plane P and the second driving motor 242B is disposed in front of the vertical plane P, the front-rear distance between the first driving motor 242A and the vertical plane P may be shorter than the front-rear distance between the first driving motor 242A and the rear end of the main body 100, and the front-rear distance between the second driving motor 242B and the vertical plane P may be shorter than the front-rear distance between the second driving motor 242B and the front end of the main body 100. In this example, the distance reference point to the first driving motor 242A and the second driving motor 242B may be based on the first rotational shaft Y1 and the second rotational shaft Y2.

For example, the front-rear distance D1 between the first rotational shaft Y1 and the vertical plane P may be shorter than the front-rear distance D2 between the first rotational shaft Y1 and the rear end of the lower plate 210, and the front-rear distance D3 between the second rotational shaft Y2 and the vertical plane P may be shorter than the front-rear distance D4 between the second rotational shaft Y2 and the front end of the lower plate 210.

Therefore, the loads of the first driving motor 242A and the second driving motor 242B may act adjacent to the center of the main body 100 with respect to the front-rear direction. Therefore, the loads of the first driving motor 242A and the second driving motor 242B are stably supported by the driving wheels 241A and 241B, and the traveling of the robot 1 may be stabilized.

The driving unit 240 may include the first power transmission unit (or first gears) 243A for transmitting the rotational power of the first driving motor 242A to the first driving wheel 241A and the second power transmission unit (or second gears) 243B for transmitting the rotational power of the second driving motor 242B to the second driving wheel 241B. The first power transmission unit 243A and the second power transmission unit 243B may include a gear box and a plurality of gears disposed in the gear box, respectively. One of the first power transmission unit 243A and the second power transmission unit 243B may be eccentrically forward of the vertical plane P, and the other thereof may be eccentrically rearward of the vertical plane P.

The driving unit 240 may further include a front caster (or front driven wheel) 244 and a rear caster (or rear driven wheel) 245. The front caster 244 and the rear caster 245 may be provided on the bottom surface of the main body 100. For example, the front caster 244 and the rear caster 245 may be provided on the bottom surface of the lower plate 210. At least one front caster 244 and at least one rear caster 245 may be provided. Preferably, pairs of the front caster 244 and pairs of the rear caster 245 are provided on the left and right sides of the lower plate 210.

The front casters 244 may be provided on the front side of the bottom surface of the lower plate 210. The front casters 244 may be disposed in front of the vertical plane P. The rear casters 245 may be provided on the rear side of the bottom surface of the lower plate 210. The rear caster 245 may be disposed behind the vertical plane P.

The front casters 244 and the rear casters 245 may be disposed adjacent to the front end and the rear end of the main body 100, and may be disposed relatively far from the vertical plane P. For example, the front-rear distance between the front caster 244 and the vertical plane P may be longer than the front-rear distance between the front caster 244 and the front end of the main body 100, and the front-rear distance between the rear caster 245 and the vertical plane P may be longer than the front-rear distance between the rear caster 245 and the rear end of the main body 100. In this case, the distance reference point between the front casters 244 and the rear casters 245 may be based on a portion connected to the lower plate 210.

For example, a front-rear distance D5 between the front caster 244 and the vertical plane P may be longer than the front-rear distance D6 between the front caster 244 and the front end of the lower plate 210, and the front-rear distance D7 between the rear caster 245 and the vertical plane P may be longer than the front-rear distance D8 between the rear caster 245 and the rear end of the lower plate 210. Therefore, the front caster 244 may reliably deter the robot 1 from overturning forward, and the rear caster 245 may reliably deter the robot 1 from overturning backward.

Figure 10:
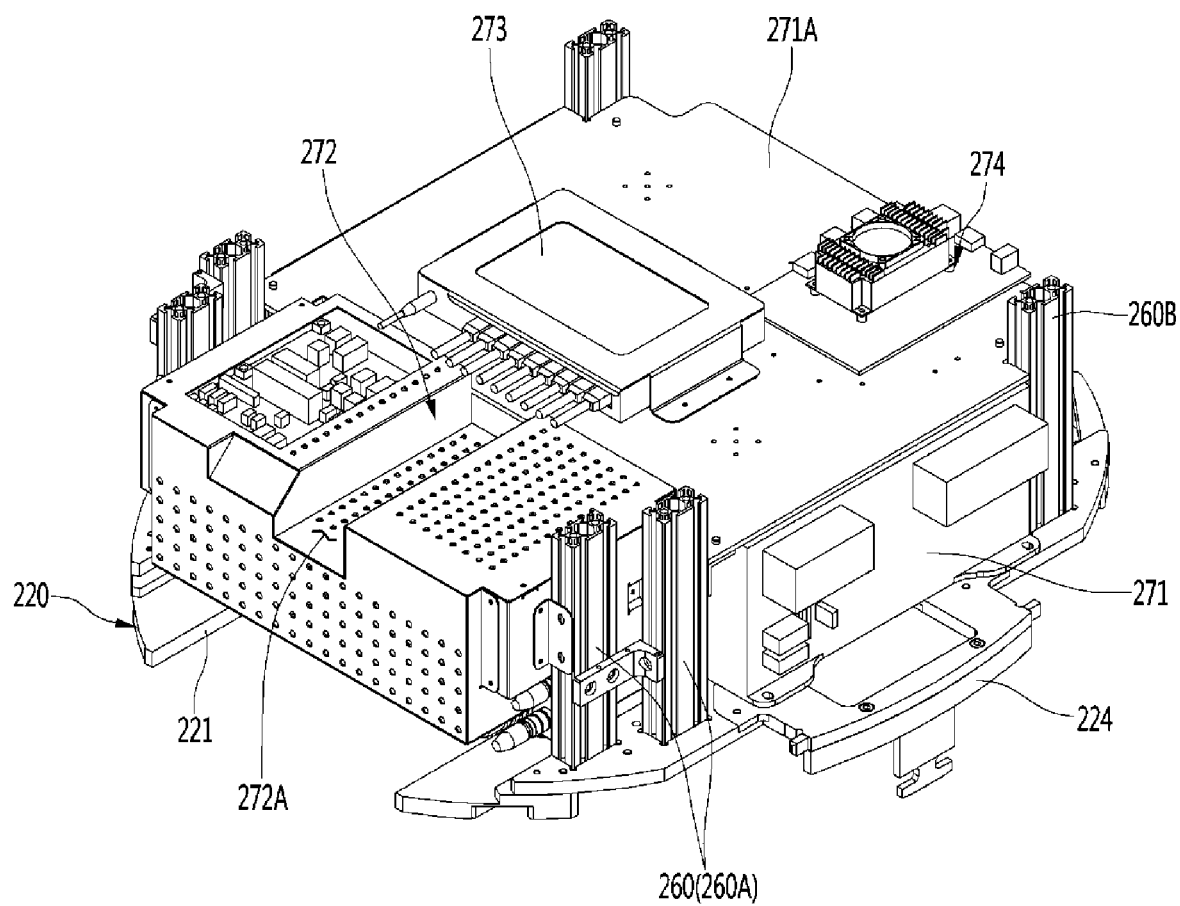
FIG. 10 is a perspective view of an upper plate of the robot of FIG. 1 according to an embodiment.
Figure 11:
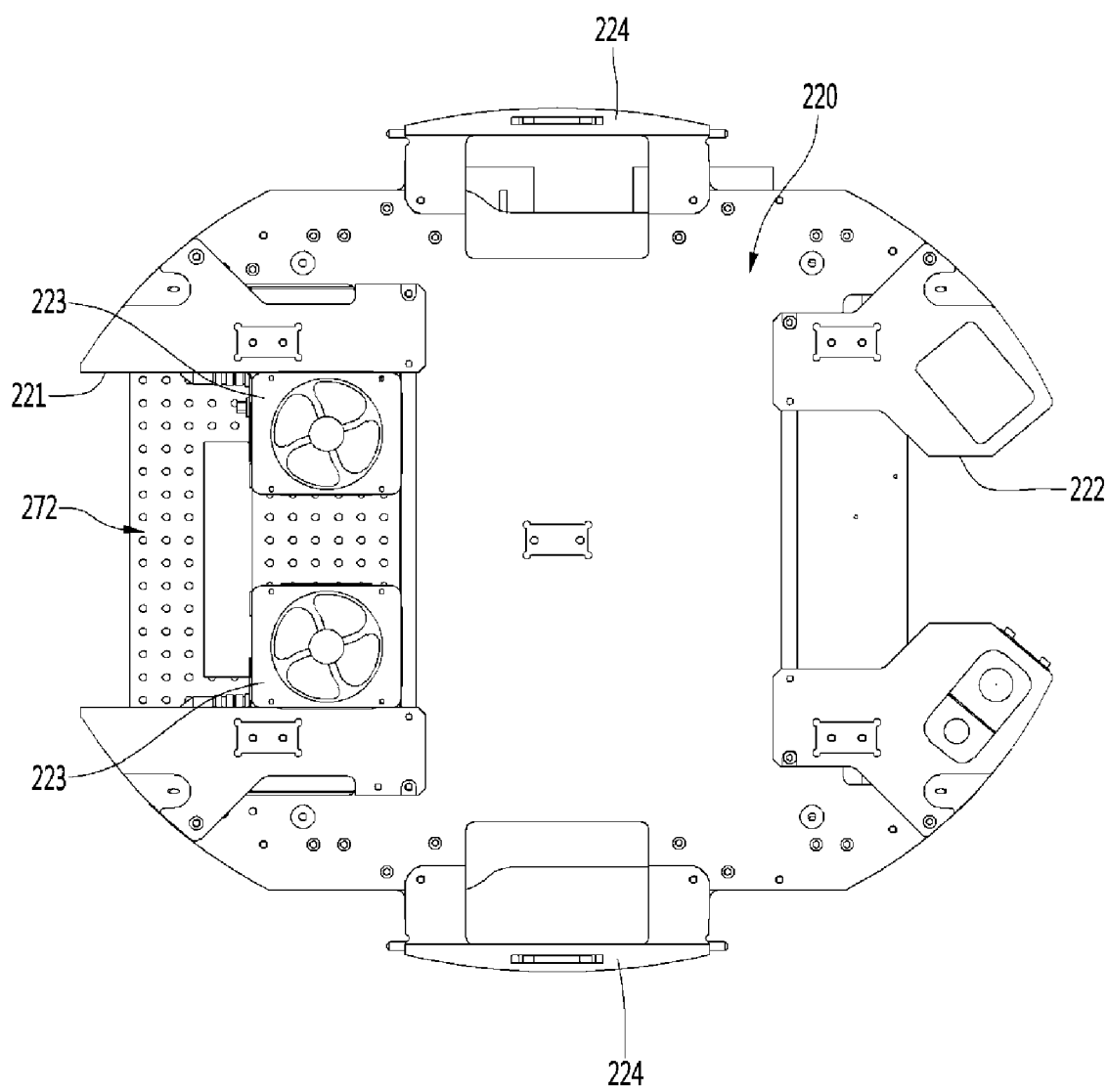
FIG. 11 is a bottom view of the upper plate of FIG. 10 according to an embodiment.

FIG. 10 is a perspective view of the upper plate 220 according to an embodiment, and FIG. 11 is a bottom view of the upper plate 220 according to an embodiment. The upper plate 220 may be made of a single plate member or a combination of plurality of plate members.

The housing connection portion (or housing connection surface) 224 formed on the upper plate 220 may protrude laterally outward beyond the battery 271. Therefore, the housing connection portion 224 and the housing 300 may be easily connected without interference from the battery 271.

The plurality of upper supporting frames 260 provided on the top surface of the upper plate 220 may include a first upper supporting frame 260A provided in front of the upper plate 220, and the second upper supporting frame 260B provided in rear of the upper plate 220. The first upper supporting frame 260A may be referred to as a front supporting frame, and the second supporting frame 260B may be referred to as a rear supporting frame.

The first upper supporting frame 260A may support the front side of the top plate 230 from the lower side. The first upper supporting frame 260A may be disposed in front of the vertical plane P (see FIG. 7). The first upper supporting frame 260A may be disposed on the side of the control box 272.

The second upper supporting frame 260B may support the rear side of the top plate 230 from the lower side. The second upper supporting frame 260B may be disposed at the rear side of the vertical plane P. The second upper supporting frame 260B may be disposed at the rear side of the battery 271.

A plurality of first upper supporting frames 260A and a plurality of second upper supporting frame 260A may be provided. For example, the number of the first upper supporting frames 260A may be larger than the number of the second upper supporting frames 260B. For example, the upper plate 220 may include two pairs of first upper supporting frames 260A and one pair of second upper supporting frames 260B. Therefore, the loads of the body display unit 500 and the head display unit 600 disposed on the front upper side of the top plate 230 may be stably supported to the first upper supporting frames 260A.

The control box 272 may be disposed between at least one pair of first upper supporting frames 260A. Therefore, the control box 272 may be fixed in position in the horizontal direction.

The control box 272 may cover at least part of the front cutout portion 221 from the upper side. At least one heat dissipating fan 223A may be disposed below the control box 272. The heat dissipating fan 223A may perform heat dissipation of the control box 272.

The front surface of the battery 271 may be in contact with or adjacent to the back surface of the control box 272, and the back surface of the battery 271 may be in contact with or adjacent to the second upper supporting frame 260B. Therefore, the battery may be fixed in position in the front-rear direction.

The support panel 271A disposed on the upper side of the battery 271 may be fastened to the first upper supporting frame 260A and the second upper supporting frame 260B. For example, the first upper supporting frame 260A and the second upper supporting frame 260A may be provided with an L-shaped fastening bracket (not illustrated) fastened to the support panel 271A. Therefore, the battery 271 may be firmly fixed with respect to the vertical direction.

Figure 12:
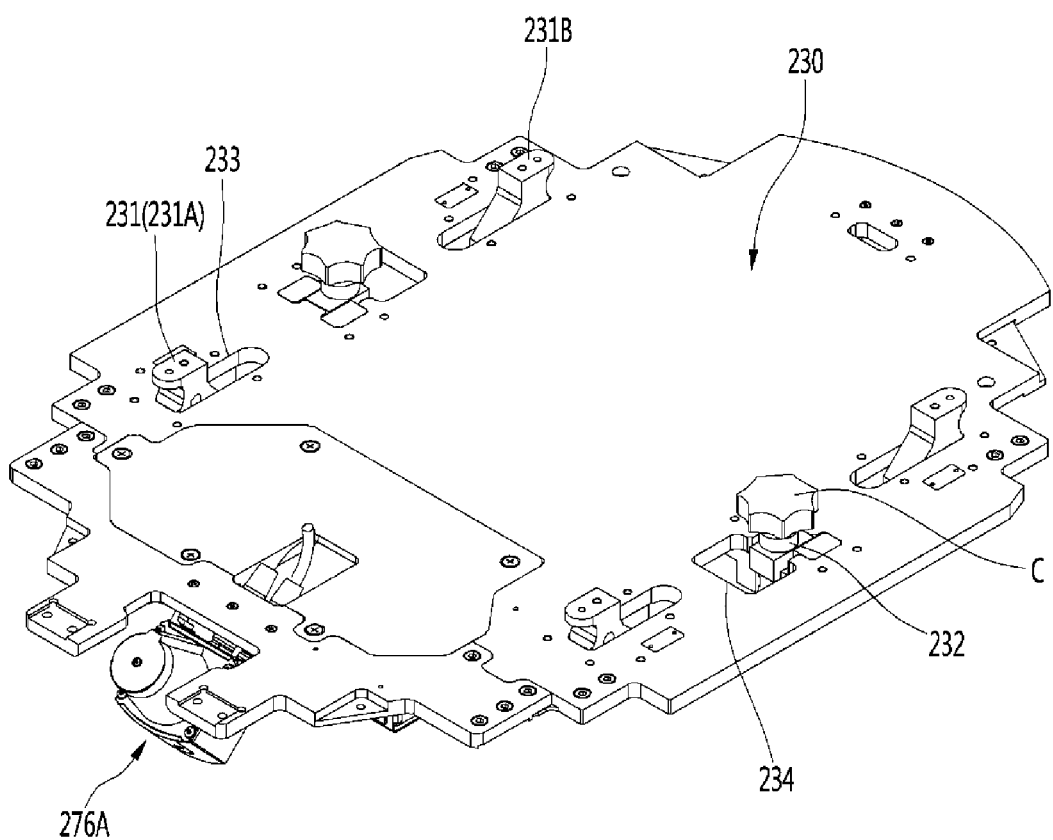
FIG. 12 is a perspective view of a top plate of the robot of FIG. 1 according to an embodiment.
Figure 13:
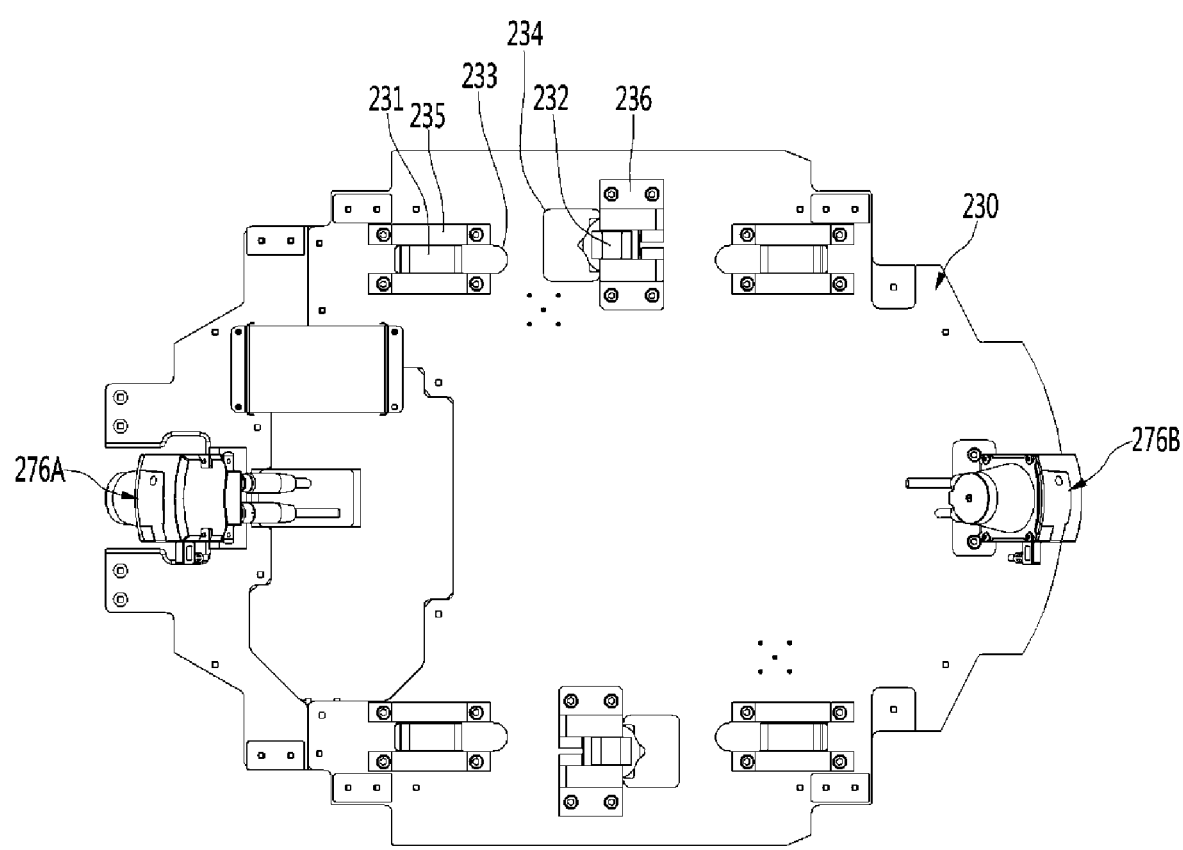
FIG. 13 is a bottom view of the top plate of FIG. 12 according to an embodiment.

FIG. 12 is a perspective view of the top plate 230 according to an embodiment, and FIG. 13 is a bottom view of the top plate 230 according to an embodiment. The top plate 230 may be made of a single plate member or a combination of a plurality of plate members.

The cliff sensor 276A may be provided on the front side of the bottom surface of the top plate 230, and the backcliff sensor 276B may be provided on the rear side of the bottom surface of the top plate 230.

The top plate 230 may have through-holes 233 formed therethrough in the vertical direction. The module guide 231 may protrude upward from the top plate 230 through the through-holes 233.

In addition, a guide supporter (or guide support bracket) 235 for rotatably supporting the module guide 231 may be provided on the bottom surface of the top plate 230. For example, the rotational shaft of the module guide 231 may be disposed below the top plate 230 and inside of the main body 100.

With this configuration, the module guide 231 may be rotated between a first position in the main body 100 and a second position protruding upward from the main body 100 through the through-hole 233. For example, the module guide 231 may be rotated between a first position below the top plate 230 and a second position protruding upward from the top plate 230 through the through-hole 233. In one example, the through-hole 233 may be formed to have a sufficiently large size to not interfere with the rotating module guide 231.

In addition, an opening hole 234 that passes in the vertical direction and is spaced apart from the through-hole 233 may be formed in the top plate 230. The module fastening portion 232 may protrude upward from the top plate 230 through the opening hole 234.

The module fastening portion 232 may be fastened to the service module M (see FIG. 2). For example, the module fastening portion 232 may be fastened to the fastening member C that restrains the service module M.

In addition, a fastening portion supporter (or module fastening support bracket) or 236 for rotatably supporting the module fastening portion 232 may be provided on the bottom surface of the top plate 230. For example, a rotational shaft of the module fastening portion 232 may be disposed below the top plate 230 and inside of the main body 100.

With this configuration, the module fastening portion 232 may be rotated between a third position in the main body 100 and a fourth position facing the upper side of the main body 100 through the opening hole 234. For example, the module fastening portion 232 may be rotated between a third position below the top plate 230 and a fourth position facing the upper side of the top plate 230 through the opening hole 234.

In this case, the opening hole 234 may be formed to have a sufficiently large size to not interfere with the rotating module fastening portion 232 and the fastening member C fastened to the module fastening portion 232. Therefore, the fastening member C may be accommodated on the lower side of the top plate 230, that is, the inside of the main body 100 while being fastened to the module fastening portion 232.

When the robot 1 is used without the mobile module M (see FIG. 2), the module guide (or protrusion) 231 and the module fastening portion (or latch) 232 may not protrude upward from the top plate 230 and the module supporting plate 400 (see FIG. 3). Therefore, an object or the like may be placed on the top surface of the module supporting plate 400.

When the service module M (see FIG. 2) is mounted on the robot 1, the module guide 231 may protrude upward from the top plate 230 through the through-hole 233, pass through the sub through-hole 411 (see FIG. 3) of the module supporting plate 400, and protrude upward from the module supporting plate 400. In addition, the module fastening portion 232 may protrude upward from the top plate 230 through the opening hole 234, pass through the sub opening hole 412 (see FIG. 3) of the module supporting plate 400, and protrude upward the module supporting plate 400.

In one example, a guide inserting portion (not illustrated) into which the module guide 231 is inserted may be formed on the bottom surface of the service module M. Therefore, the service module M may be guided to an installation position, and the service module M also may be fixed with respect to a horizontal plane associated with a top surface of the top plate 230.

In addition, a fastening hole (not illustrated) through which the fastening member C passes may be formed on the bottom surface of the service module M. The fastening member C may be fastened to the module fastening portion 232 through the fastening hole. Therefore, the module fastening portion 232 may help to fix the service module M horizontally and vertically.

The plurality of module guides 231 provided on the top plate 230 may include a front module guide 231A provided at the front side of the top plate 230, and a rear module guide 231B provided at the rear side of the top plate 230. The front module guide 231A may be disposed in front of the module fastening portion 232, and the rear module guide 231B may be disposed behind the module fastening portion 232. That is, the module fastening portion 232 may be disposed between the front module guide 231A and the rear module guide 231B.

Figure 14:
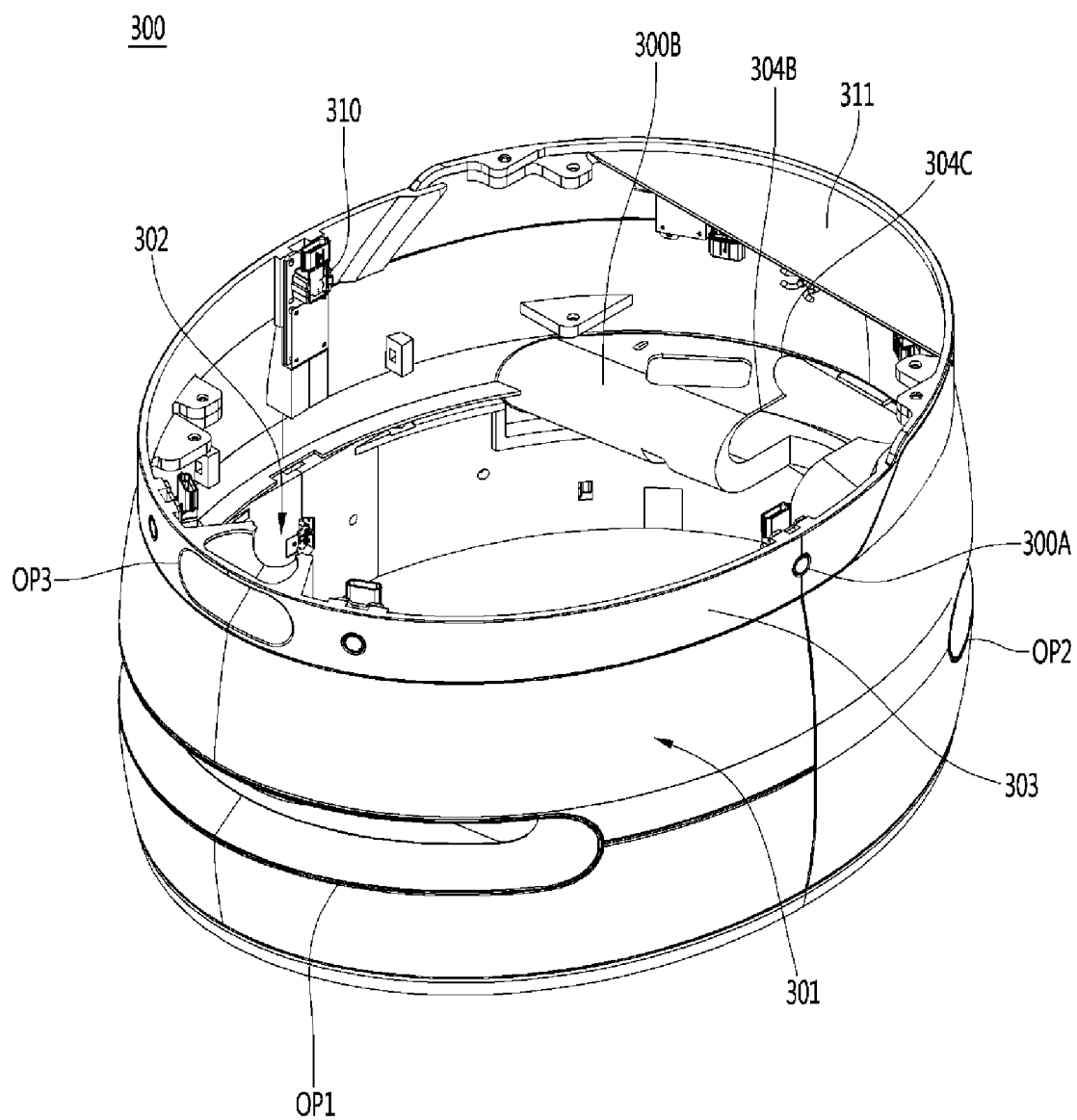
FIG. 14 is a perspective view of a housing of the robot of FIG. 1 according to an embodiment.
Figure 15:
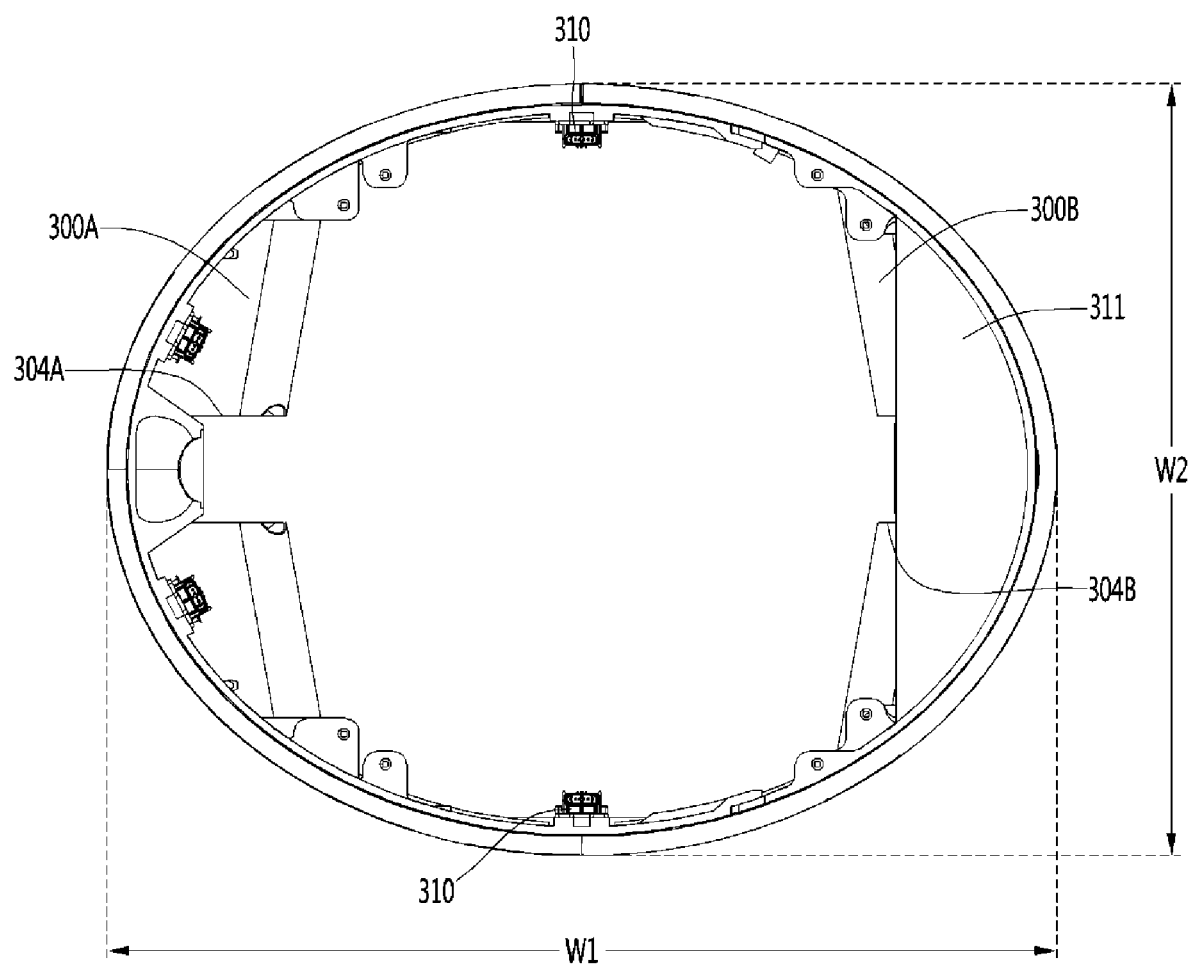
FIG. 15 is a plan view of the housing of FIG. 14 according to an embodiment.
Figure 16:
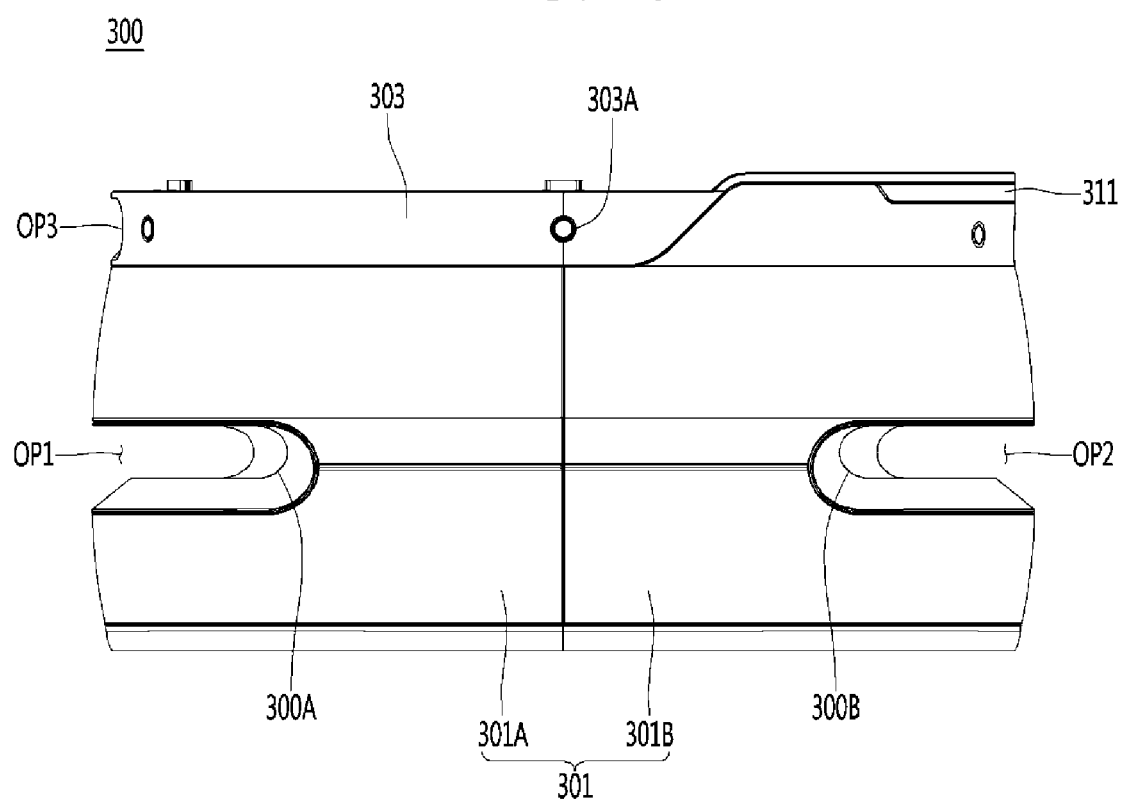
FIG. 16 is a side view of the housing of FIG. 14 according to an embodiment.

FIG. 14 is a perspective view of the housing 300 according to an embodiment, FIG. 15 is a plan view of the housing 300 according to an embodiment, and FIG. 16 is a side view of the housing 300 according to an embodiment. As described below, a longitudinal length W1 of the housing 300 may be longer than the horizontal width W2. Thus, the housing may have an oval or an ovoidal shape.

The housing 300 may include an outer cover 301 and an inner cover 302 disposed inside the outer cover 301. The housing 300 may further include an upper cover 303 disposed at the upper end of the outer cover 301. The outer cover 301 can form the outer appearance of the main body 100. The horizontal cross-sectional shape of the outer cover 301 may be approximately elliptical.

The outer cover 301 may include a first outer cover (or front cover) 301A and a second outer cover (or rear cover) 301B detachably fastened to the first outer cover 301A. The first outer cover 301A may form the front side of the outer cover 301, and the second outer cover 301B may form the rear side of the outer cover 301. The front opening OP1 may be formed in the first outer cover 301A, and the rear opening OP2 may be formed in the second outer cover 301B.

Similar to the outer cover 301, the inner cover 302 may also include a first inner cover and a second inner cover detachably fastened to each other. In one example, the first inner cover may be fastened to the first outer cover 301A, and the second inner cover may be fastened to the second outer cover 301B.

Therefore, the first outer cover 301A and the first inner cover may be referred to as a first housing body, and the second outer cover 301B and the second inner cover may be referred to as a second housing body. For example, the housing 300 may include the first housing body and the second housing body detachably fastened to each other. Therefore, the operator may easily access the inner module 200 by separating the housing 300 into the first housing body and the second housing body at the time of maintenance of the robot.

The inner cover 302 may be provided inside the outer cover 301. For example, the inner cover 302 may be provided inside the lower inner side of the outer cover 301. A pressure sensing module (not illustrated) or other pressure sensor may be provided between the inner cover 302 and the outer cover 301. Therefore, when an obstacle or the like is hit on the outer cover 301 during traveling of the robot 1, the pressure sensing module may sense the impact.

The upper cover 303 may be formed along the upper end of the outer cover 301. The upper cover 303 may be substantially annular. The upper cover 303 may include an upper opening OP3.

A plurality of ultrasonic sensors 310 spaced from each other along the circumferential direction of the upper cover 303 may be provided on the inner circumference of the upper cover 303. In one example, an opening 303A may be formed in the upper cover 303 at a position corresponding to each of the ultrasonic sensors 310. The ultrasonic sensor 310 may detect geographic features or obstacles around the robot 1 through the opening 303A.

In addition, the housing 300 may include a light emitting unit 311. For example, the light emitting unit 311 may be provided at the rear side of the upper cover 303. The type of the light emitting unit 311 is not limited. For example, the light emitting unit 311 may be, for example, a light emitting diode (LED). The light emitting unit 311 may be controlled by the control box 272 and may serve as a rear warning lamp of the robot 1.

A front recessed cover 300A corresponding to the front opening OP1 may be provided inside the front side of the housing 300, and a rear recessed cover 300B corresponding to the rear opening OP2 may be provided inside the rear side of the housing 300. For example, the front recessed cover 300A may be provided inside the first outer cover 301A, and the rear recessed cover 300B may be provided inside the second outer cover 301B. The front recessed cover 300A and the rear recessed cover 300B may be integrally formed with the outer cover 301, or may be separate members fastened to the outer cover 301.

The front recessed cover 300A may have a shape recessed horizontally rearward from the front opening OP1. The rear recessed cover 300B may have a shape horizontally recessed forward in the rear opening OP2. The front recessed cover 300A may be provided with a front lidar avoiding portion (or front lidar cutout) 304A for preventing interference with the front lidar 275A (see FIG. 4). The front lidar avoiding portion 304A may be formed by cutting the central portion of the front recessed cover 300A. Air blown by the heat dissipating fan 223, which dissipates heat from the control box 272 below the control box 272 (see FIG. 6), may be discharged to the outside of the main body 100 through the front lidar avoiding portion 304A and the front opening OP1.

The rear recessed cover 300B may be formed with a rear lidar avoiding portion (or rear lidar cutout) 304B for preventing interference with the rear lidar 275B (see FIG. 4). The rear lidar avoiding portion 304B may be formed by cutting the center portion of the rear recessed cover 3006.

In addition, the inner opening portion 304C may be formed on the top surface of the rear recessed cover 300B. For example, the inner opening portion 304C may be formed on the top surface of the front side of the rear recessed cover 300B. The front end of the inner opening portion 304C may be formed to be continuous with the rear lidar avoiding portion 304B. The backcliff sensor 276B (see FIG. 4) may detect the travel surface behind the robot 1 via the inner opening 304C and the rear opening OP2.

The front recessed cover 300A may minimize the exposure of the inside of the main body 100 to the outside through the front opening OP1. The rear recessed cover 300B may minimize the exposure of the inside of the main body 100 to the outside through the rear opening OP2. In addition, the front recessed cover 300A and the rear recessed cover 300B may reinforce the rigidity of the housing 300.

In addition, the front recessed cover 300A may prevent the laser beams transmitted and received in the front lidar 275A from entering the inside of the main body 100. The rear recessed cover 300B may prevent the laser beams transmitted and received in the rear laser beam 275B from entering the inside of the main body 100.

Figure 17:
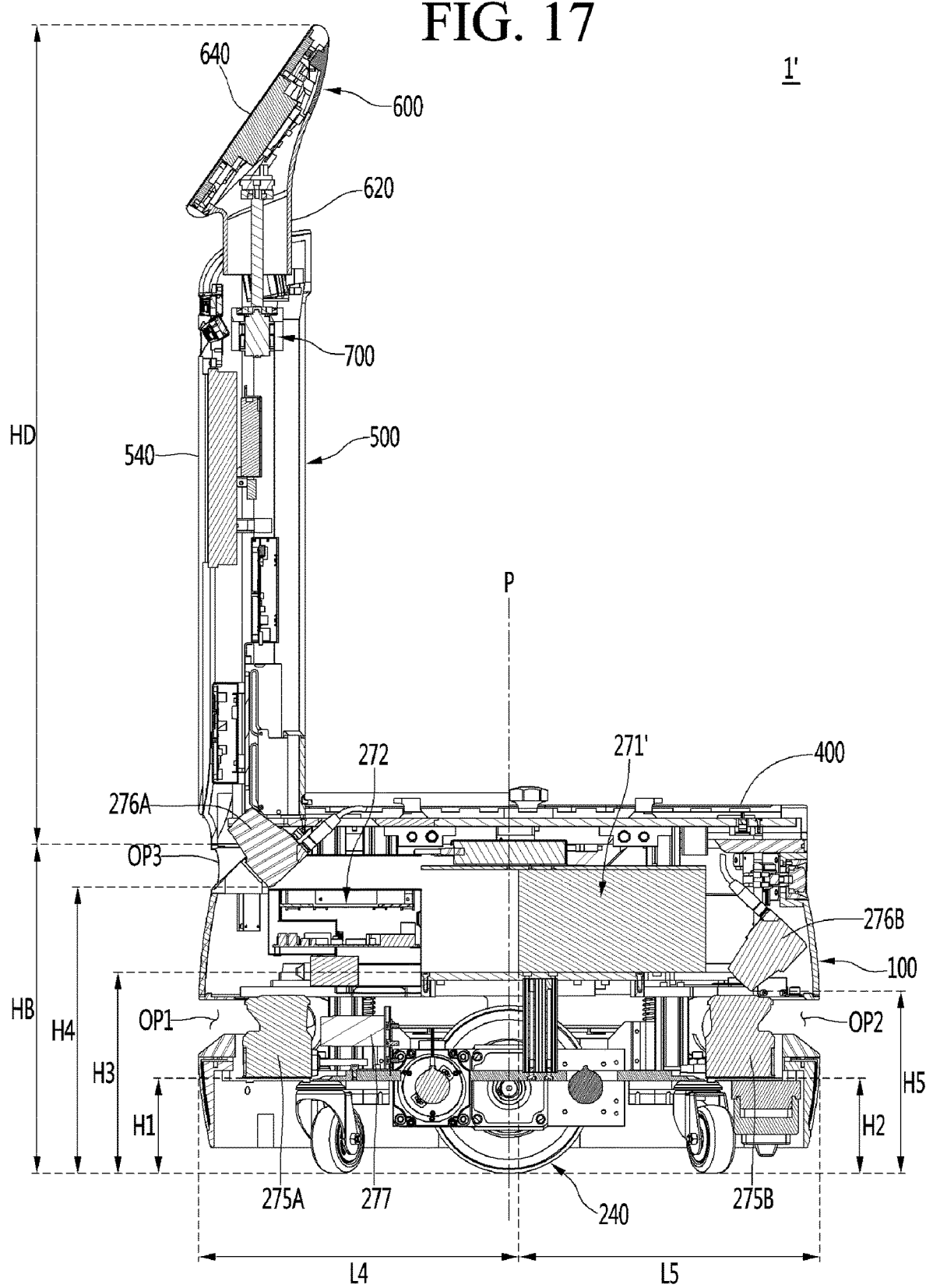
FIG. 17 is a cross-sectional view illustrating an inside of a robot of FIG. 1 according to another embodiment.

FIG. 17 is a cross-sectional view illustrating the inside of a robot 1' according to a second embodiment. Hereinafter, the contents overlapping with those described above with respect to robot 1 in FIGS. 1-16 will be omitted and the differences will be mainly described.

A battery 271' of a robot 1' according to the present embodiment may not overlap a vertical plane P that crosses the midpoint with respect to a length of a main body 100 in a front-back direction. For example, the battery 271' may be disposed between the vertical plane P and the rear end of the main body 100 in the front-back direction.

The battery 271 may be disposed inside the rear side of the main body 100. For example, the front-rear distance L4 between the front end of the main body 100 and the battery 271' may be longer than the front-rear distance L5 between the rear end of the main body 100 and the battery 271'. In another example, a front-rear distance between a front end of upper plate 220 and a front surface of the battery 271' may be longer than a distance between a rear end of the upper plate 220 and a rear surface of the battery 271'.

Therefore, the loads of the display units 500 and 600 and the load of the battery 271' may be balanced relative to the vertical plane P. In this embodiment, since the battery 271' is disposed further rearward in the main body 100 than the above-described embodiment, this embodiment may be applied to an example where the loads or weight of the display units 500 and 600 are relatively heavier and/or the load (or weight) of the battery 271' is relatively lighter.

In addition, the third lower supporting frame 250C' of the present embodiment may be disposed behind the vertical plane P. For example, the third lower supporting frame 250C' may be disposed below a portion of the battery 271'. For example, the third lower supporting frame 250C' may be disposed below a central region of the battery 271'. The third lower supporting frame 250C' may prevent the upper plate 220 from sagging due to the load of the battery 271'.

Figure 18:
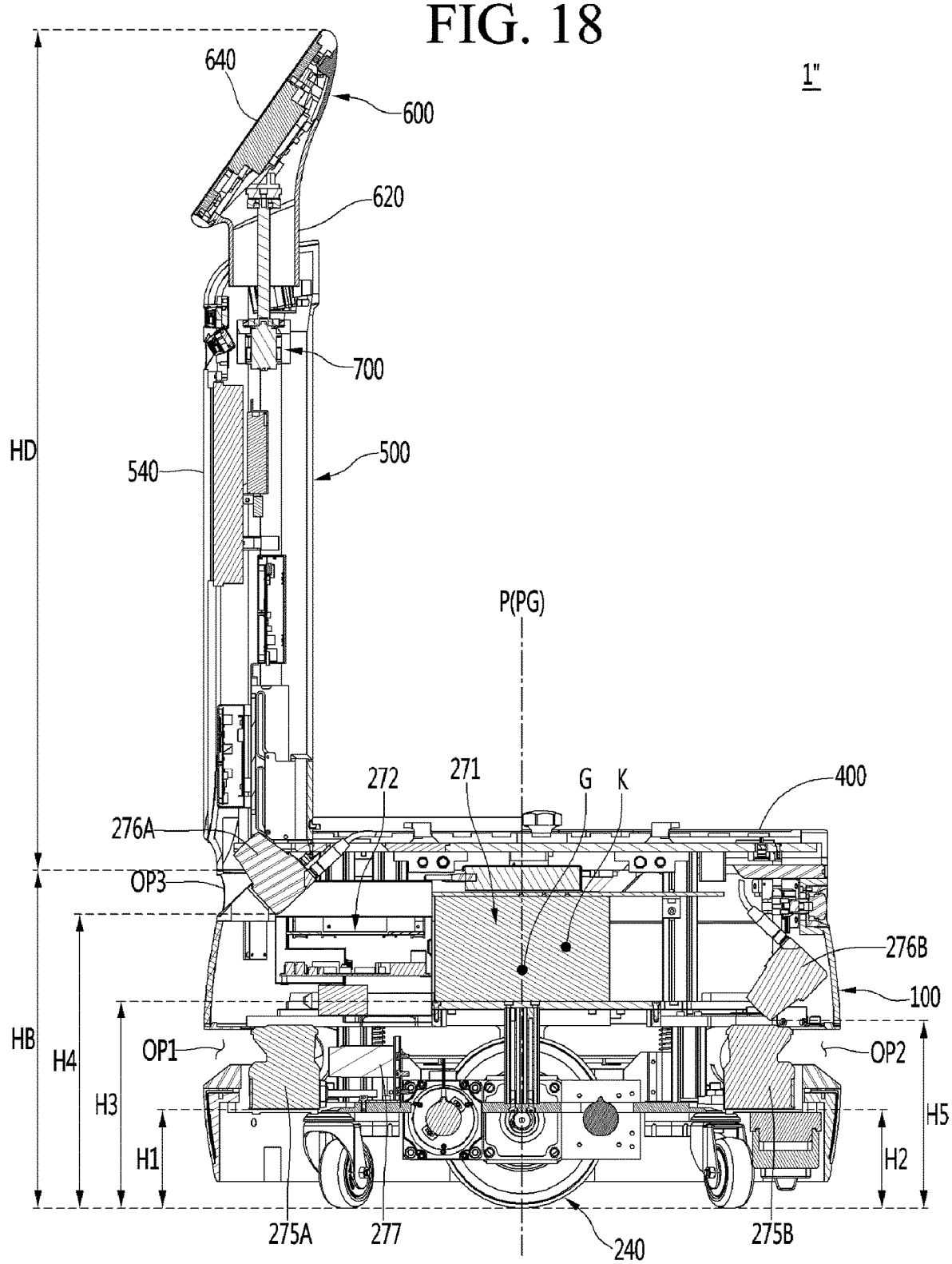
FIG. 18 is a cross-sectional view illustrating an inside of a robot of FIG. 1 according to another embodiment.

FIG. 18 is a cross-sectional view illustrating the inside of a robot 1" according to a third embodiment. Hereinafter, the contents overlapping with those described above with respect to robot 1 in FIGS. 1-16 and robot' in FIG. 17 will be omitted and the differences will be mainly described.

The center K of gravity of a battery 271" of a robot 1" according to the an embodiment is disposed more rearward than a vertical plane PG that crosses the center G of gravity of a main body 100 in a horizontal direction. In some examples, the vertical plane PG may coincide with the vertical plane P that crosses the midpoint with respect to the longitudinal length of the main body 100 in a front-rear horizontal direction. However, embodiments are not limited thereto. For example, the vertical plane PG that crosses the center G of gravity of a main body 100 may be positioned relatively forward of the vertical plane P due to a lode of the display units 500 and 600.

Therefore, the load acting on the display unit 500 (600) and the center K of gravity of the battery 271" may be balanced. This effect is advantageous even when the battery 271" is not eccentric rearward in the main body 100. This embodiment may be applied, for example, in the case where the center K of gravity of the battery 271" is eccentric rearward as compared with the above-described embodiments shown in FIGS. 1-17.

According to embodiments, the display unit may be disposed above the front portion of the main body, and the battery may be disposed eccentrically to the rear side of the main body. Therefore, the load of the display unit and the load of the battery may be balanced, and the robot may be prevented from tilting forward or backward or overturning.

In addition, the battery may overlap the vertical plane that crosses the midpoint with respect to the longitudinal length of the main body in the horizontal direction. Therefore, it is possible to prevent the load of the main body from excessively leaning backward by the battery, which is a relatively heavy component. In addition, the display unit may be supported by the top plate, and the battery may be supported by the upper plate disposed below the top plate. Therefore, the center of gravity of the robot may be lowered by the battery.

In addition, the number of the front supporting frames for supporting the front portion of the top plate may be larger than the number of the rear supporting frames for supporting the rear portion of the top plate. Therefore, the load of the display unit disposed on the upper side of the front portion of the top plate may be stably supported. In addition, at least part of the plurality of lower supporting frames for supporting the upper plate may be disposed below the battery. This makes it possible to prevent the upper plate from sagging due to the load of the battery.

In addition, the longitudinal length of the main body may be longer than the horizontal width of the main body. This allows the modular mobile robot to travel stably if the load balance in the longitudinal direction is achieved.

In addition, the display unit may include the body display unit, the head display unit, and the rotation mechanism. That is, since the display unit includes a plurality of configurations, the load of the display unit may be heavy. Therefore, even if the battery having a large capacity (load) is incorporated, the load of the display unit may be balanced with the load of the battery back and forth.

In addition, the height of the display unit may be higher than the height of the main body. For example, since the display unit is formed sufficiently large, the load of the display unit may be heavy. Therefore, even if the battery having a large capacity (load) is incorporated, the load of the display unit may be balanced with the load of the battery back and forth.

In addition, the control box having a constant load may be disposed in front of the battery. Therefore, even if the battery having a large capacity (load) is incorporated, the load of the display unit and the load of the control box may be balanced with the load of the battery back and forth. In addition, at least part of the control box may overlap the display unit in the vertical direction. Therefore, the main body may be made compact in the front-back direction. In addition, the control box may be supported by the upper plate disposed below the top plate. Therefore, the center of gravity of the robot may be lowered by the control box.

In addition, the module supporting plate may support the service module disposed behind the display unit from the lower side. Therefore, the robot may travel in a state where the service module is laid on, thereby providing convenience to the user.

In addition, the driving shaft of the driving wheel may be disposed on the horizontal plane that crosses the midpoint with respect to the longitudinal length of the main body in the horizontal direction. Therefore, the load acting on the center of gravity of the robot disposed on or near the horizontal plane may be stably supported by the driving wheel. In addition, the first driving motor and the second driving motor may be disposed on opposite sides of the horizontal plane. Therefore, the loads of the first driving motor and the second driving motor may be balanced back and forth.

In addition, the first driving motor and the second driving motor may be disposed adjacent to the vertical plane. That is, the loads of the first driving motor and the second driving motor may act adjacent to the central portion of the main body with respect to the longitudinal direction. Therefore, the loads of the first driving motor and the second driving motor may be stably supported by the driving wheel, and the traveling of the robot may be stabilized.

In addition, the front casters and the rear casters may prevent the robot from being inclined forward or backward or overturning. In addition, the front casters and the rear casters may be disposed relatively far from the vertical plane. Therefore, the front casters and the rear casters may more reliably prevent the robot from overturning forward or backward. Embodiments provide a robot capable of stable traveling by preventing the load from being directed forward or backward.

In one embodiment, a robot may include: a main body provided with a traveling unit; a display unit disposed above a front portion of the main body; and a battery incorporated in the main body. The battery may overlap a vertical plane that crosses a midpoint with respect to a longitudinal length of the main body in a horizontal direction. A front-rear distance between the vertical plane and a front surface of the battery may be shorter than a front-rear distance between the vertical plane and a back surface of the battery.

In one embodiment, a robot may include: a main body provided with a traveling unit; a display unit disposed above a front portion of the main body; and a battery incorporated in the main body. A front-rear distance between a front end of the main body and the battery may be longer than a front-rear distance between a rear end of the main body and the battery.

In one embodiment, a robot may include: a main body provided with a traveling unit; a display unit disposed above a front portion of the main body; and a battery incorporated in the main body. A center of gravity of the battery may be disposed more rearward than a vertical plane that crosses a center of gravity of the main body in a horizontal direction.

The main body may include: a lower plate provided with the traveling unit; an upper plate spaced above the lower plate, wherein the battery is seated thereon; and a top plate spaced above the upper plate and supporting the display unit. The main body may further include: a front supporting frame elongated vertically between the upper plate and the top plate and supporting a front portion of the top plate; and a rear supporting frame elongated vertically between the upper plate and the top plate and supporting a rear portion of the top plate. The number of the front supporting frame may be greater than the number of the rear supporting frame. The main body may further include a plurality of lower supporting frames vertically elongated between the lower plate and the upper plate, and at least part of the plurality of lower supporting frames may be disposed below the battery. A longitudinal length of the main body may be longer than a horizontal width of the main body.

The display unit may include: a body display unit elongated in a vertical direction; a head display unit rotatably connected to an upper portion of the body display unit; and a rotation mechanism for rotating the head display unit with respect to the body display unit. A height of the display unit may be higher than a height of the main body.

The robot may further include a control box disposed in front of the battery in the main body. At least part of the control box may overlap the display unit in a vertical direction.

The main body may include: a lower plate provided with the traveling unit; an upper plate spaced above the lower plate, wherein the battery and the control box are seated thereon; and a top plate spaced above the upper plate, disposed above the battery and the control box, and supporting the display unit.

The robot may further include a module supporting plate supporting a service module disposed behind the display unit from a lower side, and mounted on a top surface of the main body.

The traveling unit may include: a driving wheel rotating about a driving shaft that is elongated in a horizontal direction; and a driving motor providing rotational power to the driving wheels. The driving shaft may be disposed on the vertical plane.

The traveling unit may include: a first driving wheel rotating about a first driving shaft; a second driving wheel rotating about a second driving shaft; a first driving motor disposed behind the vertical plane and providing rotational power to the first driving wheel; and a second driving motor disposed in front of the vertical plane and providing rotational power to the second driving wheel. The first driving shaft and the second driving shaft may be disposed on a straight line. The first driving shaft and the second driving shaft may be disposed on the vertical plane.

A front-rear distance between the first driving motor and the vertical plane may be shorter than a front-rear distance between the first driving motor and a rear end of the main body, and a front-rear distance between the second driving motor and the vertical plane may be shorter than a front-rear distance between the second driving motor and a front end of the main body.

The traveling unit may include: at least one front caster provided below the main body and disposed in front of the vertical plane; and at least one rear caster provided below the main body and disposed behind the vertical plane. A front-rear distance between the front caster and the vertical plane may be longer than a front-rear distance between the front caster and a front end of the main body. A front-rear distance between the rear caster and the vertical plane may be longer than a front-rear distance between the rear caster and a rear end of the main body.

In one embodiment, a robot may comprise a body including a support plate and a wheel that rotates to move the robot; and a battery received in the body and coupled to the support plate. A vertical plane may extend along a rotational axis of the wheel in a first direction. The battery may be positioned such that a center of the battery is separated from the vertical plane by a prescribed distance in a second direction that differs from the first direction.

The robot may further comprise a display provided above a front region of the body.

The support plate may be an intermediate plate, and the body may further include: a lower plate provided below the intermediate plate and to which the wheel is rotatably coupled; and a top plate provided above the intermediate plate and coupled to the display.

The body may further include front upper support posts provided to extend vertically between the intermediate plate and the top plate and to support a front portion of the top plate; and one or more rear upper support posts provided to extend vertically between the intermediate plate and the top plate and to support a rear portion of the top plate. A quantity of the front upper support posts included in the body is greater than a quantity of the rear upper support posts included in the body.

The body may further include: a plurality of lower support posts provided to extend vertically between the lower plate and the intermediate plate and to support the intermediate plate. At least one of the lower support posts may be positioned under a portion of the battery.

A longitudinal length of the support plate in the second direction is may be greater than a width of the support plate in the first direction.

The wheel may be a first driving wheel that rotates about a driving shaft that extends along the vertical plane. The robot may further comprise a first motor that provides rotational force to the first driving wheel.

The first driving wheel may be provided on a first lateral side of the body. The robot may further comprises: a second driving wheel provided on a second lateral side of the body and rotating about a second driving shaft; and a second motor that provides rotational force to the second driving wheel. The second driving shaft may extend along the vertical plane.

A first rotational shaft of the first motor may be positioned between the vertical plane and a front end of the support plate. A second rotational shaft of the second motor may be positioned between the vertical plane and a rear end of the support plate.

The robot may further comprise a front caster provided below the body and positioned between the vertical plane and a front end of the support plate; and a rear caster provided below the body and disposed between the vertical plane and a rear end of the support plate. A distance between the front caster and the vertical plane may be greater than a distance between the front caster and the front end of the support plate. A distance between the rear caster and the vertical plane is greater than a distance between the rear caster and the rear end of the support plate.

The robot may further comprise a module supporting plate configured to support a service module, and mounted on a top surface of the body.

In another embodiment, a robot may comprise: a body including a support plate, and a wheel that rotates to move the robot; a display provided over a first end of the support plate; and a battery received in the body and coupled to the support plate. A distance between the first end of the support plate and the battery may be greater than a distance between a second end of the support plate and the battery, the second end being opposite to the first end.

The support plate may be an intermediate plate, and the body may further include: a lower plate provided below the intermediate plate and to which the wheel is rotatably coupled; and an upper plate provided above the intermediate plate and configured to support the display.

The wheel may be a first driving wheel provided on a first lateral side of the support plate and rotating about a first driving shaft. The robot may further comprise: a second driving wheel provided on a second lateral side of the support plate and rotating about a second driving shaft; a first motor that provides rotational force to the first driving wheel; and a second motor that provides rotational force to the second driving wheel. The first driving shaft and the second driving shaft may have a common rotational axis.

A first rotational shaft of the first motor may be positioned between the common rotational axis and the first end of the support plate, and a second rotational shaft of the second motor may be positioned between the common rotational axis and the second end of the support plate.

The robot may further comprise: a first caster provided below the body and positioned between the common rotational axis and the first end of the support plate; and a second caster provided below the body and positioned between the common rotational axis and the second end of the support plate. A distance between the first caster and the common rotational axis is greater than a distance between the first caster and the front end of the support plate, and a distance between the second caster and the common rotational axis is greater than a distance between the second caster and the second end of the support plate.

In another embodiment, a robot may comprise a body including a support plate, and a wheel that rotates to move the robot; and a battery received in the body and coupled to the support plate. A plane may extend along a rotational axis of the wheel in a first direction, and the battery may be positioned in the body such that a center of gravity of the battery is separated by a prescribed distance from the plane in a second direction that differs from the first direction.

The may further comprise a display provided above a first end of the support plate. The support plate may be an intermediate plate, and the body may further include: a lower plate provided below the intermediate plate and to which the wheel is coupled; and an upper plate provided above the intermediate plate and configured to support the display.

The wheel may be a first driving wheel provided on a first lateral side of the support plate and rotating about a first driving shaft. The robot may further comprise: a second driving wheel provided on a second lateral side of the support plate and rotating about a second driving shaft; and at least one motor that provides rotational force to the first driving wheel and the second driving wheel. The first driving shaft and the second driving shaft may have a common rotational axis.

The center of gravity for the battery may be positioned rearward of the common rotational axis of the first driving shaft and the second driving shaft.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a body including a support plate and a wheel that rotates to move the robot; and
a battery received in the body and coupled to the support plate,
wherein:
a vertical plane extends along a rotational axis of the wheel in a first direction, and
the battery is positioned such that a center of the battery is separated from the vertical plane by a prescribed distance in a second direction that differs from the first direction,
wherein:
the wheel is a first driving wheel that rotates about a driving shaft that extends along the vertical plane,
the first driving wheel is provided on a first lateral side of the support plate, and
the robot further comprises:
a first motor that provides rotational force to the first driving wheel,
a second driving wheel provided on a second lateral side of the support plate and rotating about a second driving shaft; and
a second motor that provides rotational force to the second driving wheel, and
the second driving shaft extends along the vertical plane.

2. The robot according to claim 1, further comprising:
a display provided above a front region of the support plate.

3. The robot according to claim 2, wherein the support plate is an intermediate plate, and the body further includes:
a lower plate provided below the intermediate plate and to which the wheel is rotatably coupled; and
a top plate provided above the intermediate plate and coupled to the display.

4. Robot according to claim 3, wherein:
the body further includes a plurality of lower support posts provided to extend vertically between the lower plate and the intermediate plate and to support the intermediate plate, and
at least one of the lower support posts is positioned under a portion of the battery.

5. The robot according to claim 1, wherein a longitudinal length of the support plate in the second direction is greater than a width of the support plate in the first direction.

6. The robot according to claim 1, wherein a first rotational shaft of the first motor is positioned between the vertical plane and a front end of the support plate, and a second rotational shaft of the second motor is positioned between the vertical plane and a rear end of the support plate.

7. The robot according to claim 1, further comprising a module supporting plate configured to support a service module over the body.

8. A robot comprising:
a body including a support plate and a wheel that rotates to move the robot; and a battery received in the body and coupled to the support plate, wherein:
a vertical plane extends along a rotational axis of the wheel in a first direction,
the battery is positioned such that a center of the battery is separated from the vertical plane by a prescribed distance in a second direction that differs from the first direction,
the robot further comprises a display provided above a front region of the support plate,
the support plate is an intermediate plate,
the body further includes:
a lower plate provided below the intermediate plate and to which the wheel is rotatably coupled;
a top plate provided above the intermediate plate and coupled to the display,
front upper support posts provided to extend vertically between the intermediate plate and the top plate and to support a front portion of the top plate; and
one or more rear upper support posts provided to extend vertically between the intermediate plate and the top plate and to support a rear portion of the top plate, and
a quantity of the front upper support posts included in the body is greater than a quantity of the rear upper support posts included in the body.

9. A robot comprising:
a body including a support plate and a wheel that rotates to move the robot; and
a battery received in the body and coupled to the support plate,
wherein:
a vertical plane extends along a rotational axis of the wheel in a first direction,
the battery is positioned such that a center of the battery is separated from the vertical plane by a prescribed distance in a second direction that differs from the first direction,
the wheel is a first driving wheel that rotates about a driving shaft that extends along the vertical plane, an the robot further comprises:
a first motor that provides rotational force to the first driving wheel;
a front caster provided below the body and positioned between the vertical plane and a front end of the support plate; and
a rear caster provided below the body and disposed between the vertical plane and a rear end of the support plate,
a distance between the front caster and the vertical plane is greater than a distance between the front caster and the front end of the support plate, and
a distance between the rear caster and the vertical plane is greater than a distance between the rear caster and the rear end of the support plate.

10. A robot comprising:
a body including a support plate, and a wheel that rotates to move the robot; a display provided over a first end of the support plate; and
a battery received in the body and coupled to the support plate,
wherein:
a distance between the first end of the support plate and the battery is greater than a distance between a second end of the support plate and the battery, the second end being opposite to the first end,
the wheel is a first driving wheel provided on a first lateral side of the support plate and rotating about a first driving shaft,
the robot further comprises:
a second driving wheel provided on a second lateral side of the support plate and rotating about a second driving shaft;
a first motor that provides rotational force to the first driving wheel; and
a second motor that provides rotational force to the second driving wheel,
the first driving shaft and the second driving shaft have a common rotational axis,
a first rotational shaft of the first motor is positioned between the common rotational axis and the first end of the support plate, and
a second rotational shaft of the second motor is positioned between the common rotational axis and the second end of the support plate.

11. The robot according to claim 10, wherein the support plate is an intermediate plate, and the body further includes:
a lower plate provided below the intermediate plate and to which the wheel is rotatably coupled; and
an upper plate provided above the intermediate plate and configured to support the display.

12. A robot comprising:
a body including a support plate, and a wheel that rotates to move the robot; a display provided over a first end of the support plate; and
a battery received in the body and coupled to the support plate,
wherein:
a distance between the first end of the support plate and the battery is greater than a distance between a second end of the support plate and the battery, the second end being opposite to the first end,
the wheel is a first driving wheel provided on a first lateral side of the support plate and rotating about a first driving shaft,
the robot further comprises:
a second driving wheel provided on a second lateral side of the support plate and rotating about a second driving shaft;
a first motor that provides rotational force to the first driving wheel;
a second motor that provides rotational force to the second driving wheel, the first driving shaft and the second driving shaft having a common rotational axis;
a first caster provided below the body and positioned between the common rotational axis and the first end of the support plate; and
a second caster provided below the body and positioned between the common rotational axis and the second end of the support plate,
a distance between the first caster and the common rotational axis is greater than a distance between the first caster and the first end of the support plate, and
a distance between the second caster and the common rotational axis is greater than a distance between the second caster and the second end of the support plate.

* * * * *

UNITED STATES PATENT AND TRADEMARK OFFICE
CERTIFICATE OF CORRECTION

PATENT NO. : 11,554,484 B2  
APPLICATION NO. : 16/715280  
DATED : January 17, 2023  
INVENTOR(S) : Chungin Jung, Sunho Yang and Eulpyo Hong Page 1 of 1

It is certified that error appears in the above-identified patent and that said Letters Patent is hereby corrected as shown below:

On the Title Page

Column 1, Add:
(30) Foreign Application Priority Data
January 2, 2019 (KR)...............................PCT/KR2019/000048

Signed and Sealed this
Twenty-eighth Day of February, 2023

Katherine Kelly Vidal
*Director of the United States Patent and Trademark Office*